United States Patent
Jeon et al.

(10) Patent No.: US 11,379,017 B2
(45) Date of Patent: Jul. 5, 2022

(54) ELECTRONIC DEVICE AND METHOD FOR CONTROLLING PIXELS ADJACENT TO SENSOR ARRANGED INSIDE DISPLAY, AND COMPUTER READABLE MEDIUM

(71) Applicant: SAMSUNG ELECTRONICS CO., LTD., Suwon-si (KR)

(72) Inventors: Namhyeon Jeon, Suwon-si (KR); Sungwon Ryu, Suwon-si (KR); Hyunchang Shin, Suwon-si (KR); Bowon Jung, Suwon-si (KR); Hyojun Koo, Suwon-si (KR); Gyudong Eom, Suwon-si (KR); Seungjae Lee, Suwon-si (KR); Jihan Lee, Suwon-si (KR); Junyoung Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/428,790

(22) PCT Filed: Feb. 19, 2020

(86) PCT No.: PCT/KR2020/002420
§ 371 (c)(1),
(2) Date: Aug. 5, 2021

(87) PCT Pub. No.: WO2020/171601
PCT Pub. Date: Aug. 27, 2020

(65) Prior Publication Data
US 2022/0121250 A1    Apr. 21, 2022

(30) Foreign Application Priority Data
Feb. 19, 2019  (KR) .................. 10-2019-0019300

(51) Int. Cl.
*G06F 1/16*      (2006.01)
*G06F 3/041*     (2006.01)
*G09G 3/20*      (2006.01)

(52) U.S. Cl.
CPC .......... *G06F 1/1686* (2013.01); *G06F 1/1688* (2013.01); *G06F 3/0412* (2013.01); *G09G 3/20* (2013.01); *G09G 2340/0464* (2013.01)

(58) Field of Classification Search
CPC .... G06F 1/1686; G06F 1/1688; G06F 3/0412; G09G 3/20; G09G 2340/0464
See application file for complete search history.

(56) References Cited

U.S. PATENT DOCUMENTS 8,674,904 B2   3/2014 Taguchi et al.
9,842,549 B2   12/2017 Musgrave et al.
(Continued)

FOREIGN PATENT DOCUMENTS

KR   10-2014-0134046   11/2014
KR   10-2017-0111827   10/2017
(Continued)

OTHER PUBLICATIONS

International Search Report for PCT/KR2020/002420 dated Jun. 15, 2020, 6 pages.
(Continued)

*Primary Examiner* — Sejoon Ahn
(74) *Attorney, Agent, or Firm* — Nixon & Vanderhye, P.C.

(57) ABSTRACT

This electronic device comprises: a window comprising a first region; a display panel comprising a first opening; an adhesive member comprising an adhesive material and comprising a second opening; an opaque member comprising an opaque material disposed along the boundary of the first region; a sensor disposed under the window and visible (Continued)

through the first and second openings; and a display driving circuit configured to activate some first pixels among the pixels of the display panel disposed in a region where the display panel overlaps the opaque member.

20 Claims, 14 Drawing Sheets

(56) References Cited

U.S. PATENT DOCUMENTS

| | | | |
|---|---|---|---|
| 2012/0105400 | A1 | 5/2012 | Mathew et al. |
| 2013/0094126 | A1 | 4/2013 | Rappoport et al. |
| 2016/0071461 | A1 | 3/2016 | Lee et al. |
| 2017/0287992 | A1 | 10/2017 | Kwak et al. |
| 2018/0300526 | A1 | 10/2018 | Cho et al. |
| 2019/0130822 | A1 | 5/2019 | Jung et al. |
| 2019/0301932 | A1* | 10/2019 | Sarkar .................. G01J 3/465 |
| 2020/0285722 | A1* | 9/2020 | He ........................ G06F 21/32 |

FOREIGN PATENT DOCUMENTS

| | | |
|---|---|---|
| KR | 10-2017-0113066 | 10/2017 |
| KR | 10-2018-0117003 | 10/2018 |

OTHER PUBLICATIONS

Written Opinion of the ISA for PCT/KR2020/002420 dated Jun. 15, 2020, 5 pages.

* cited by examiner

ELECTRONIC DEVICE AND METHOD FOR CONTROLLING PIXELS ADJACENT TO SENSOR ARRANGED INSIDE DISPLAY, AND COMPUTER READABLE MEDIUM

CROSS-REFERENCE TO RELATED APPLICATIONS

This application is a national stage of International Application No. PCT/KR2020/002420 designating the United States and filed on Feb. 19, 2020 in the Korean Intellectual Property Receiving Office and claiming priority to Korean Patent Application No. 10-2019-0019300, filed on Feb. 19, 2019, in the Korean Intellectual Property Office, the disclosures of which are incorporated by reference herein in their entireties.

BACKGROUND

Field

The disclosure relates to a display. For example, various embodiments described below relate to an electronic device, method, and computer readable medium for controlling pixels adjacent to a sensor disposed in the display.

Description of Related Art

An electronic device can include at least one display. To provide a larger screen, efforts for increasing a size of a display region of the display included in the electronic device are being continued.

To increase a size of a display region of a display, an electronic device reducing a size of a bezel and disposing an externally seen sensor in the display region of the display is being developed. This electronic device can include an opaque member for hiding a wire for the display or the sensor around the sensor. Accordingly, a way for processing pixels in a display panel adjacent to the opaque member or the sensor can be required.

Technological solutions the present document seeks to achieve are not limited to the above-mentioned technological solutions, and other technological solutions not mentioned above would be able to be clearly understood by a person having ordinary skill in the art from the following statement.

SUMMARY

An electronic device) according to an example embodiment can include: a window including a first region, a display panel facing one surface of the window, and including a first opening, an adhesive member comprising an adhesive material interposed between the window and the display panel, and including a second opening, an opaque member comprising an opaque material disposed along a periphery of the first region when viewed from above the window, a sensor disposed under the window and at least partially visible through the first opening and the second opening, and a display driving circuit operably coupled to the display panel, and the display driving circuit can be configured to: activate first pixels among pixels of the display panel disposed in a region where the display panel overlaps with the opaque member when viewed from above the window.

An electronic device according to example embodiments can include: a window including a first region, a display panel facing one surface of the window, and including a first opening, an adhesive member comprising an adhesive material interposed between the window and the display panel, and including a second opening, an opaque member comprising an opaque material disposed along a periphery of the first region when viewed from above the window, a sensor disposed under the window and at least partially visible through the first opening and the second opening, and a display driving circuit operably coupled with the display panel, and the display driving circuit can be configured to: inactivate at least one pixel disposed within a projection of the opaque member when viewed from above the window among pixels of the display panel and activate at least one other pixel disposed outside of the projection of the opaque member when viewed from above the window among the pixels, based on an image of a second region of the display panel having a shape corresponding to an outer periphery of the opaque member and partially overlapping with the opaque member when viewed from above, in a state of vertically facing another surface of the window.

A method according to an example embodiment executed in an electronic device with a window including a first region, a display panel facing one surface of the window, and including a first opening, an adhesive member comprising an adhesive material interposed between the window and the display panel, and including a second opening, an opaque member comprising an opaque material disposed along a periphery of the first region when viewed from above the window, and a sensor disposed under the window and at least partially visible through the first opening and the second opening, can include: activating some of pixels of the display panel disposed in a region where the display panel overlaps with the opaque member when viewed from above the window.

A method according to an example embodiment, executed in an electronic device with a window including a first region, a display panel facing one surface of the window, and including a first opening, an adhesive member comprising an adhesive material interposed between the window and the display panel, and including a second opening, an opaque member comprising an opaque material disposed along a periphery of the first region when viewed from above the window, a sensor disposed under the window and at least partially visible through the first opening and the second opening, can include: inactivating at least one pixel disposed within the opaque member when viewed from above the window among pixels of the display panel and activating at least one other pixel disposed outside of the opaque member when viewed from above the window among the pixels, based on an image photographing a first region of the display panel having a shape corresponding to an outer periphery of the opaque member and partially overlapping with the opaque member when viewed from above, in a state of vertically facing another surface of the window.

For an electronic device according to an example embodiment with a window including a first region, a display panel facing one surface of the window, and including a first opening, an adhesive member comprising an adhesive material interposed between the window and the display panel, and including a second opening, an opaque member comprising an opaque material disposed along a periphery of the first region when viewed from above the window, and a sensor disposed under the window and at least partially visible through the first opening and the second opening, a non-transitory computer readable storage medium of various embodiments as described above can store an image of a second region of the display panel having a shape corresponding to an outer periphery of the opaque member and partially overlapping with the opaque member when viewed from above, in a state of vertically facing another surface of the window.

An electronic device, method, and computer readable medium of various embodiments can offer reinforced visibility, by controlling pixels adjacent to an externally visible sensor in a display region of a display.

An effect obtainable from the disclosure is not limited to the above-mentioned effects, and other effects not mentioned would be able to be understood from the following disclosure by a person having ordinary skill in the art to which the disclosure pertains.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
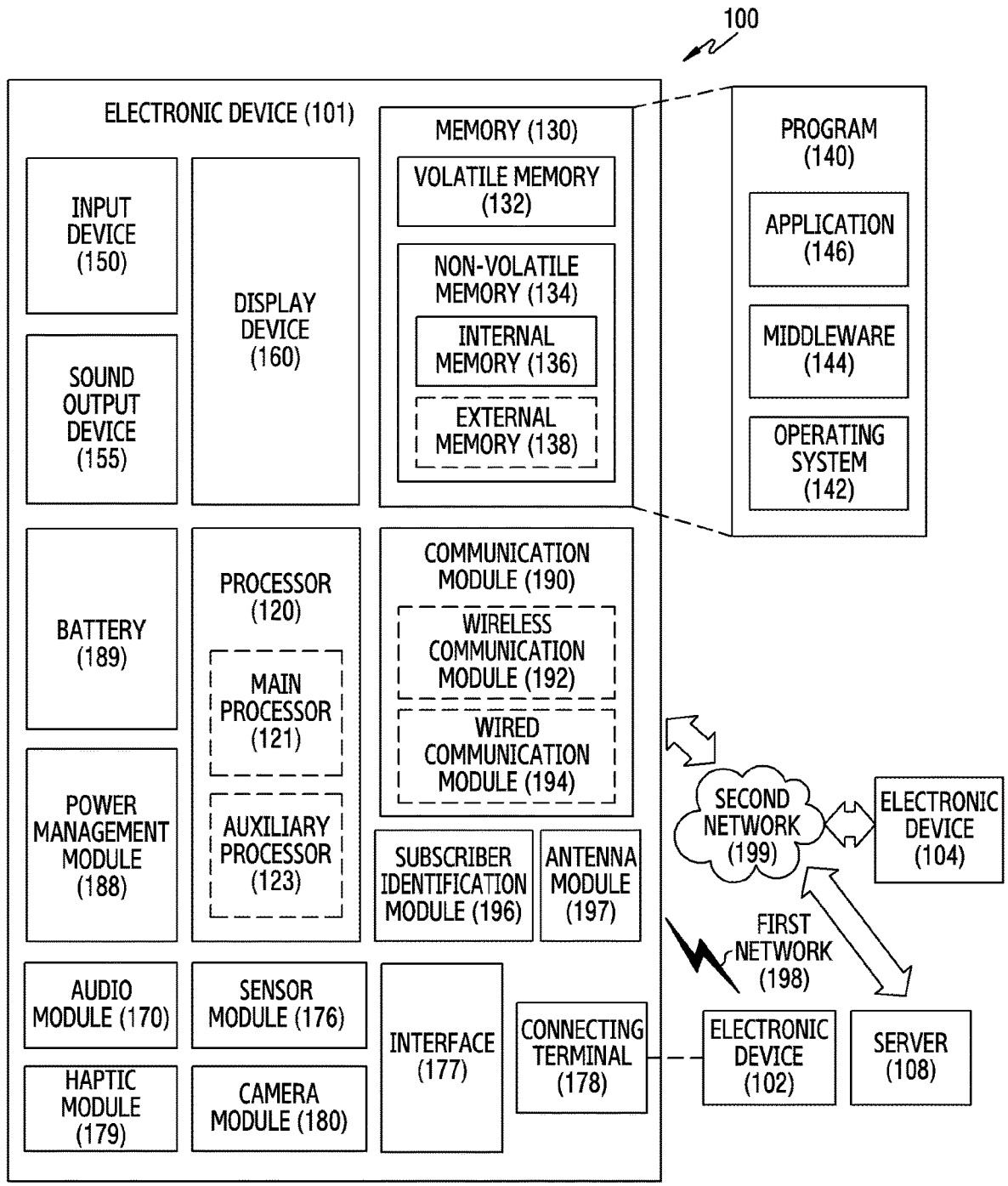
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101. The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
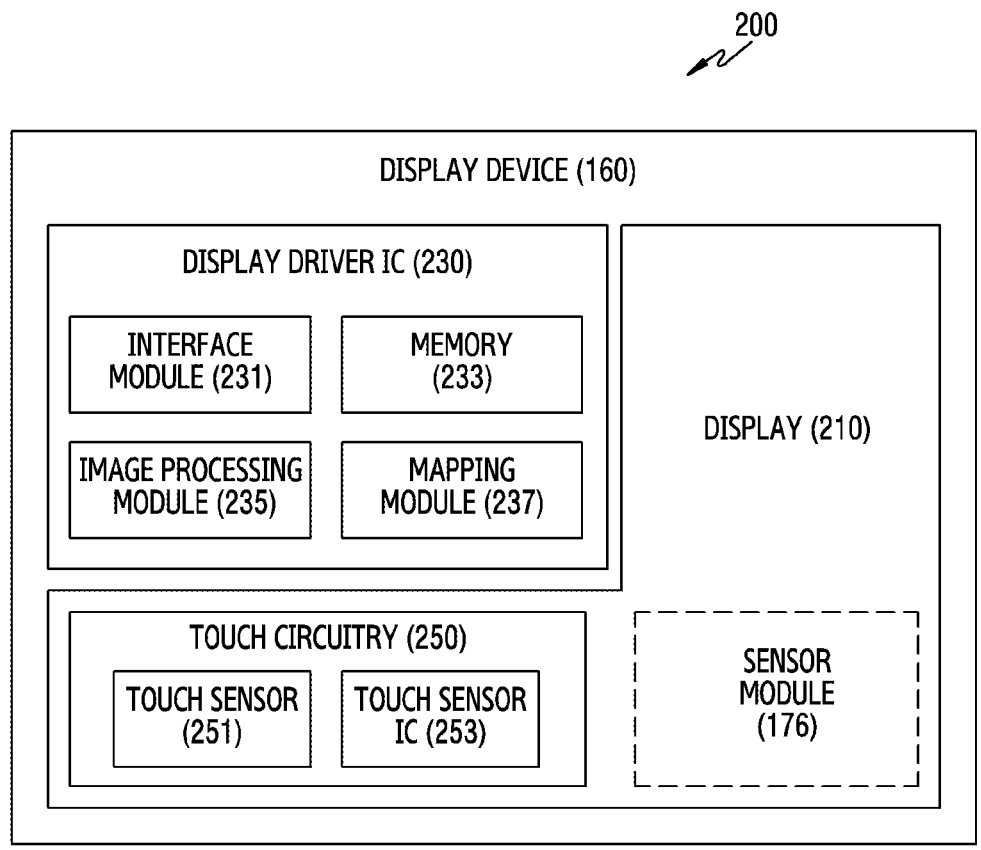
FIG. 2 is a block diagram illustrating an example configuration of an example display device according to various embodiments.

FIG. 2 is a block diagram 200 illustrating an example of the display device 160 according to various embodiments. Referring to FIG. 2, the display device 160 may include a display 210 and a display driver integrated circuit (DDI) 230 to control the display 210. The DDI 230 may include an interface module (e.g., including interface circuitry) 231, memory 233 (e.g., buffer memory), an image processing module (e.g., including image processing circuitry) 235, and/or a mapping module (e.g., including mapping circuitry) 237.

The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor integrated circuit (IC) 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
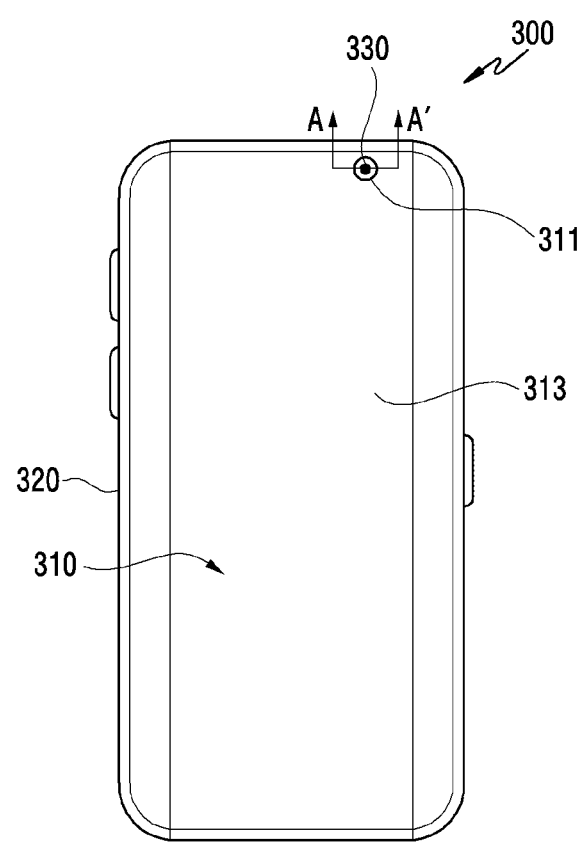
FIG. 3 is a diagram illustrating an example of an electronic device according to various embodiments.

FIG. 3 is a diagram illustrating an example of an electronic device according to various embodiments.

Referring to FIG. 3, the electronic device 300 (e.g., the electronic device 101) of various embodiments can include at least one of a display 310 (e.g., the display device 160), a front plate 320, and/or a sensor 330 (e.g., the sensor module 176, the camera module 180, or the audio module 170).

In various embodiments, the display 310 can be seen (or is at least partially visible) through at least a portion of the front plate 320. In various embodiments, the at least portion of the display 310 can be seen (the term "seen" and "visible" may be used interchangeably herein) through the front plate 320. In various embodiments, an edge of the display 310 can be formed generally identically with an outer shape adjacent to the front plate 320. Through this, a front surface of the electronic device 300 can be entirely a screen display region of the display 310. For example, the display 310 can include at least one of a light emitting diode (LED) display, an organic light emitting diode (OLED) display, a liquid crystal display (LCD), a microelectromechanical systems (MEMS) display, or an electronic paper display.

In various embodiments, the sensor 330 can be seen through the display 310. The sensor 330 can be disposed opposite to the front plate 320. In various embodiments, the sensor 330 can be disposed in a rear surface of a display region of the display 310. In various embodiments, the at least portion of the sensor 330 can be disposed passing through at least a portion of the display 310. For this, the display 310 can include an opening which is formed to insert the sensor 330. In various embodiments, the opening can be referred to as a recess or an aperture as well.

In various embodiments, the display 310 may include a first region 311 and a second region 313. In various embodiments, the first region 311 may include a partial region in a screen display region, and may correspond to a region where the sensor 330 is located. FIG. 3 illustrates one first region 311, but this is for ease and convenience of description, and the disclosure is not limited thereto. The first region 311 can be included in the plural in the electronic device 300 as well. In various embodiments, the first region 311 may be a transmission region, and may offer light (or sound) received from the outside of the electronic device 300, to the sensor 330. In various embodiments, the first region 311 may be a transmission region, and may offer light (or sound) emitted from the sensor 330, external to the electronic device. In various embodiments, the first region 311 may be formed, for example, and without limitation, as a recess, an opening, an aperture, or the like. The second region 313 is a remaining region of the display region, and may display various types of contents (e.g., a text, an image, a video, an icon, a symbol, etc.). The second region 313 can include at least any one of pixels (not shown) for displaying a color or a driving wire (not shown) for driving the pixels.

Figure 4A:
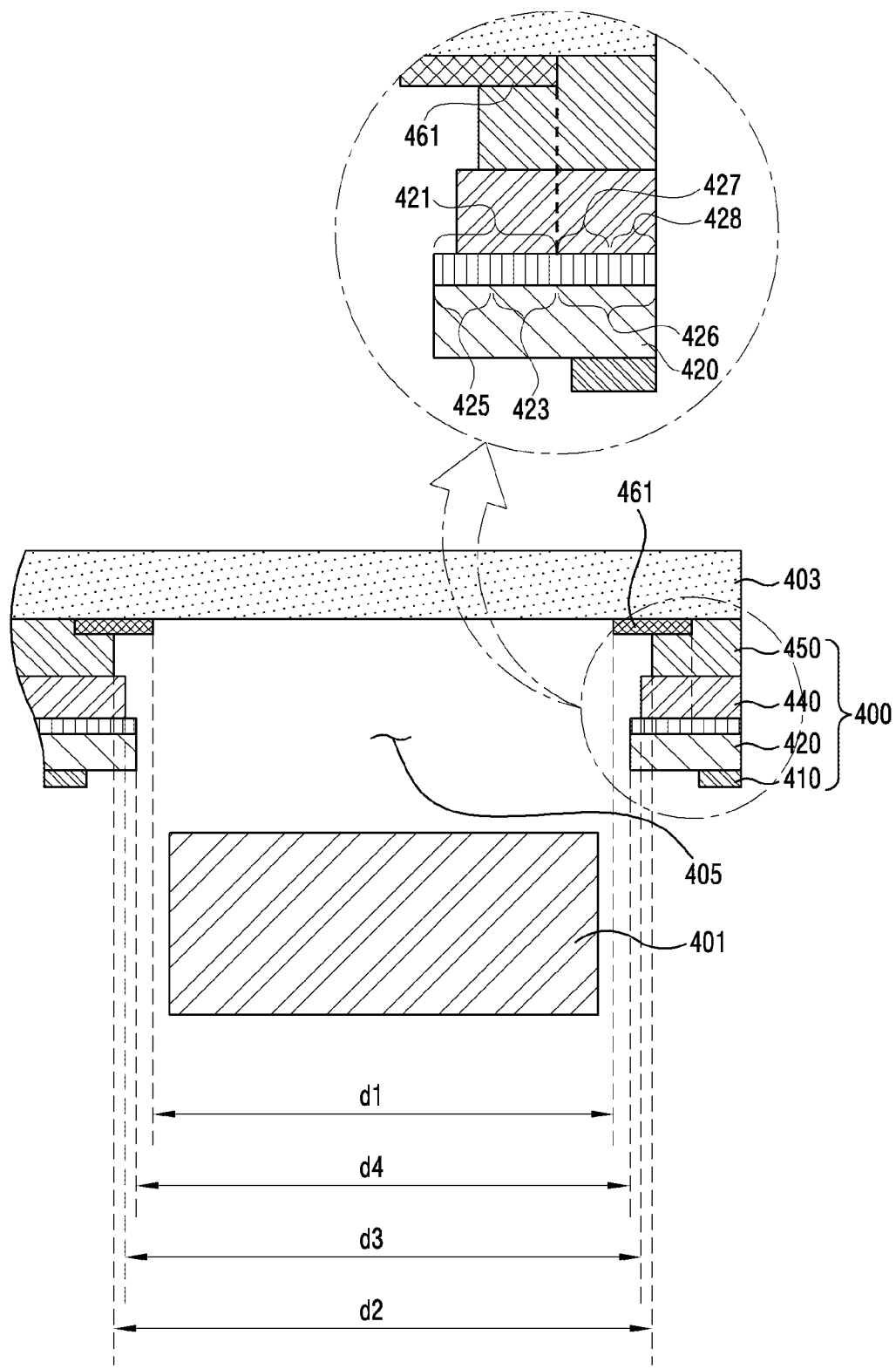
FIG. 4A is a cross-sectional view illustrating an example configuration taken along line A-A' of FIG. 3 according to various embodiments.
Figure 4B:
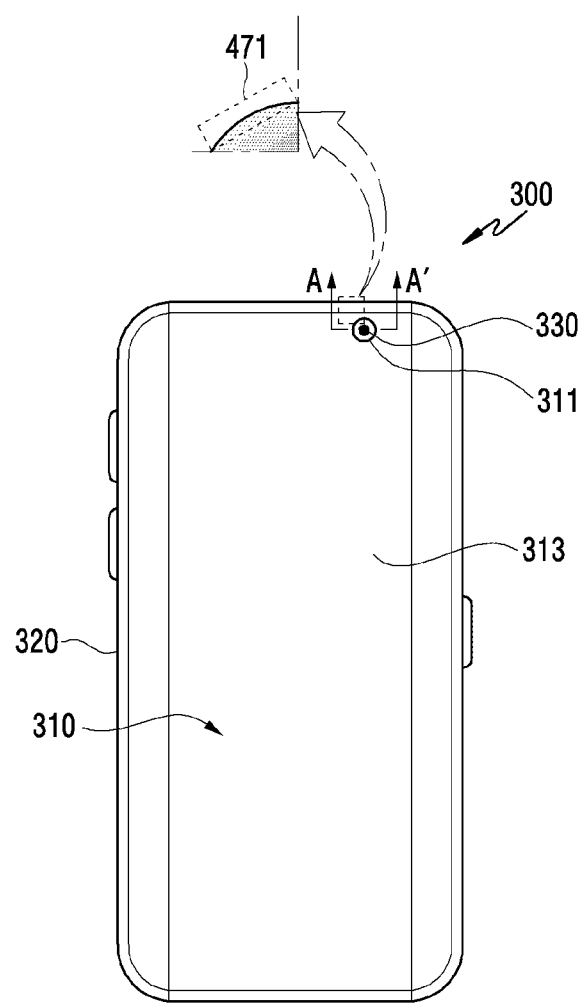
FIG. 4B is a diagram illustrating an example of a gradation effect offered through a display of an electronic device according to various embodiments.
Figure 4C:
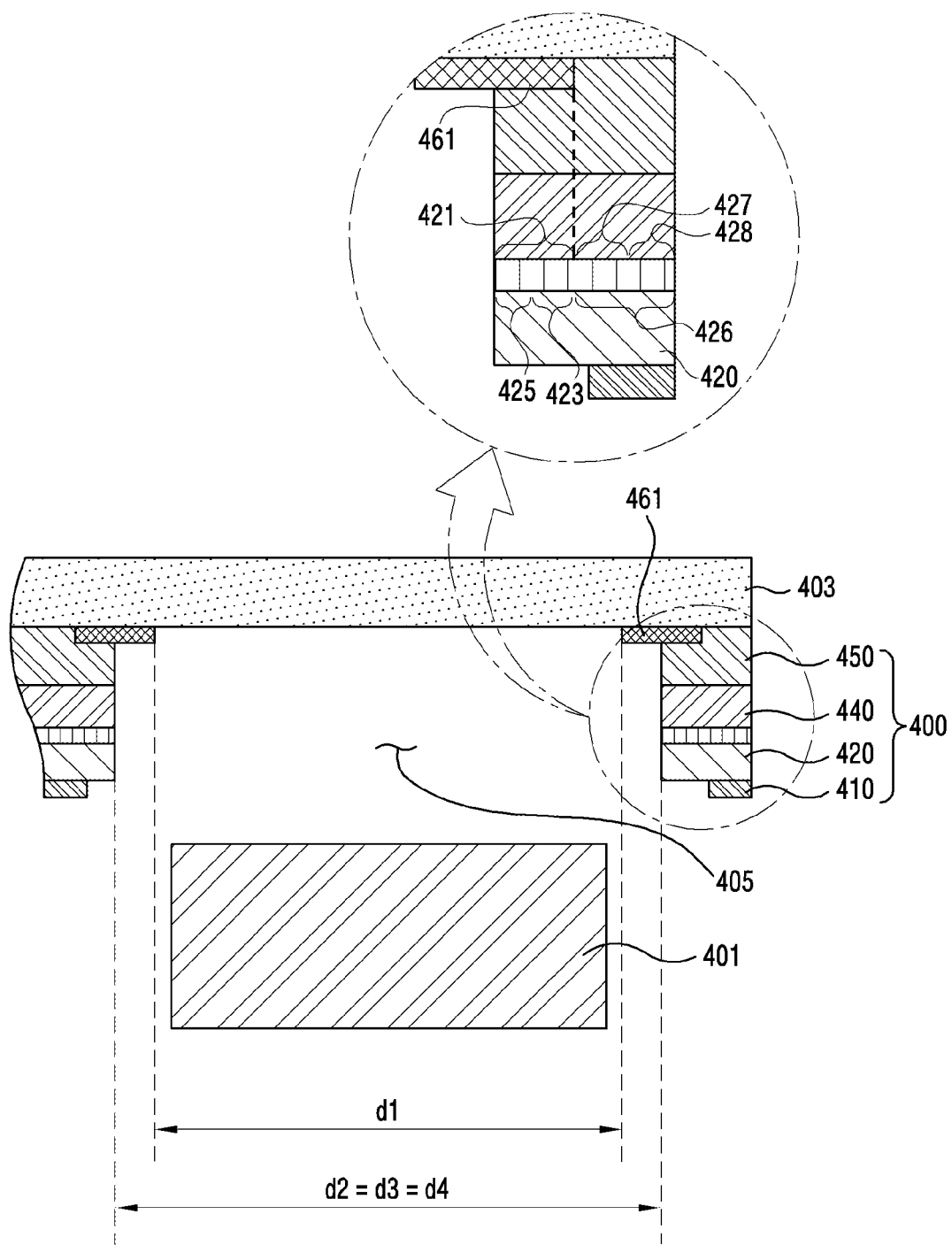
FIG. 4C is a cross-sectional view illustrating an example configuration taken along line A-A' of FIG. 3 according to various embodiments.
Figure 4D:
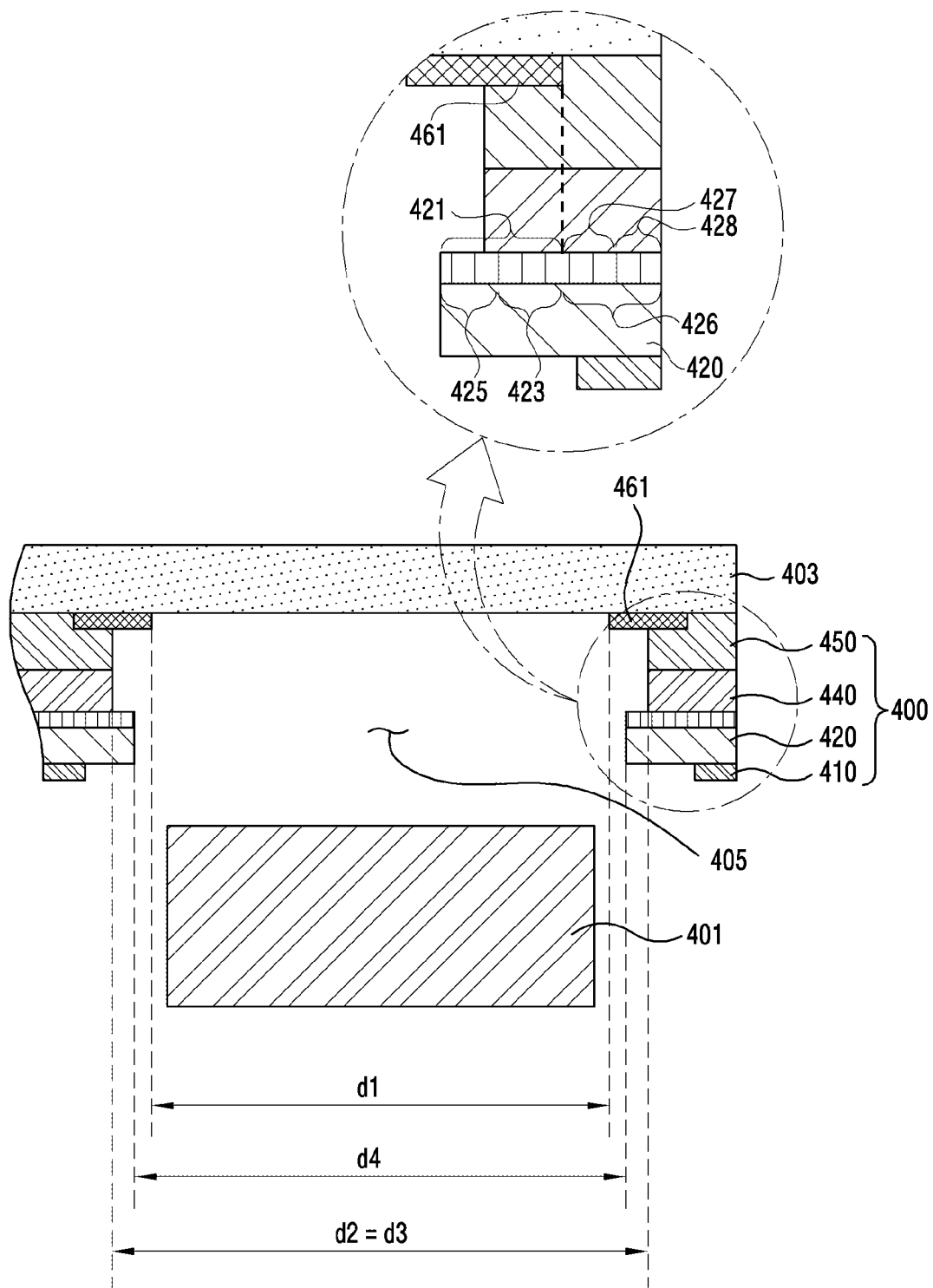
FIG. 4D is a cross-sectional view illustrating an example configuration taken along line A-A' of FIG. 3 according to various embodiments.

FIG. 4A is a cross-sectional view illustrating an example configuration taken along line A-A' of FIG. 3 according to various embodiments. FIG. 4B is a diagram illustrating an example of a gradation effect offered through a display of an electronic device according to various embodiments. FIG. 4C is a cross-sectional view illustrating an example configuration taken along line A-A' of FIG. 3 according to various embodiments. FIG. 4D is a cross-sectional view illustrating an example configuration taken along line A-A' of FIG. 3 according to various embodiments.

Referring to FIG. 4A, the display 400 (e.g., the display 310) of various embodiments can be disposed beneath a window 403 (e.g., the front plate 320), and can include an opening 405 in a location corresponding to the sensor 401 (e.g., the sensor 330). In various embodiments, the display 400 can include a support member (e.g., a support) 410, a display panel 420, a polarization member 440, an adhesive member (e.g., including an adhesive material) 450, and an opaque member (e.g., including an opaque material) 461. In various embodiments, the support member 410, the display panel 420, the polarization member 440, the adhesive member 450, and the opaque member 461 may be sequentially laminated on the sensor 401. The support member 410, the display panel 420, the polarization member 440, the adhesive member 450, and the opaque member 461 each can include the opening 405 having a different diameter. The sensor 401 can be located in at least a portion of the opening 405 when viewed from above the window 403. In an embodiment, the opaque member 461 can be printed and disposed in the window 403.

In various embodiments, the support member 410 can include a bracket disposed in the electronic device (e.g., the electronic device 300). In various embodiments, the support member 410 can support at least one of the display panel 420, the polarization member 440, the adhesive member 450, and the opaque member 461.

In various embodiments, the display panel 420 may emit light towards the window 403, thereby displaying contents. In various embodiments, the polarization member 440 may transmit light received from the window 403, with directionality. In various embodiments, the polarization member 440 may transmit light emitted from the display panel 420, with directionality.

In various embodiments, the adhesive member 450 may include an adhesive material and can attach the polarization member 440 to the window 403. In various embodiments, the adhesive member 450 can include various adhesives, such as, for example, and without limitation, at least one of an optical clear adhesive (OCA) or a pressure sensitive adhesive (PSA) or be formed by at least one of the optical clear adhesive (OCA) or the pressure sensitive adhesive (PSA), etc.

In various embodiments, the display panel 420, the polarization member 440, and the adhesive member 450 may include the opening 405 corresponding to the sensor 401. In various embodiments, the opaque member 461 may be interposed between the window 403 and the adhesive member 450, and be formed along a periphery of the opening of the adhesive member when viewed from above the window 403. In various embodiments, the opaque member 461 may decrease a transmittance in a region disposed along the periphery of the opening of the adhesive member 450. In various embodiments, the opaque member 461 can prevent and/or reduce a bubble able to be formed between the window 403 and the adhesive member 450 from being acknowledged from the outside. In various embodiments, the opaque member 461 can prevent and/or reduce side surfaces of the display panel 420, the polarization member 440, and the adhesive member 450 from being acknowledged (e.g., viewed or visible) externally according to the forming of the opening 405. In various embodiments, the opaque member 460 can include various opaque materials, including, for example, and without limitation, at least one of an ink or an opaque resin, or be formed by at least one of the ink or the opaque resin, or the like.

In various embodiments, the openings of the display panel 420, the polarization member 440, the adhesive member 450, and the opaque member 461 can be formed at mutually different sizes. In various embodiments, the openings of the display panel 420, the polarization member 440, the adhesive member 450, and the opaque member 461 can have the mutually same shape. For example, the shape can include, without limitation, a circle, an oval, and/or a polygon.

In various embodiments, the opening 405 of the display panel 420, the polarization member 440, the adhesive member 450, and the opaque member 461 can be formed bigger than a size of the sensor 401. In various embodiments, in response to the size of the sensor 401 being less than a diameter of the opening 405, the sensor 401 can be disposed to occupy at least a portion of the opening 405. In various embodiments, the size of the opening 405 can be formed less than the size of the sensor 401. In response to the size of the sensor 401 being greater than the diameter of the opening 405, the sensor 401 can be disposed under the display 400. In various embodiments, the center of the opening 405 can be substantially the same as the center of the sensor 401.

In various embodiments, assuming, by way of non-limiting example, that shapes of the openings of the display panel 420, the polarization member 440, the adhesive member 450, and the opaque member 461 are circles, a diameter of the opening formed in the opaque member 461 can be d1, a diameter of the opening formed in the adhesive member 450 can be d2, a diameter of the opening formed in the polarization member 440 can be d3, and a diameter of the opening formed in the display panel 420 can be d4. In various embodiments, the centers of the openings of the display panel 420, the polarization member 440, the adhesive member 450 and the opaque member 461, and the sensor 401, can be disposed in one axis. In various embodiments, the diameter (d1) of the opening formed in the opaque member 461 can be least among the openings of the display panel 420, the polarization member 440, the adhesive member 450, and the opaque member 461. The size of the openings of the remaining components can be small in the order of the diameter (d4) of the opening of the display panel 420, the diameter (d3) of the opening formed in the polarization member 440, and the diameter (d2) of the opening formed in the adhesive member 450.

In various embodiments, the centers of the openings of the display panel 420, the polarization member 440, the adhesive member 450, and the opaque member 461, and the sensor 401, can be disposed in one axis. The diameter (d4) of the opening formed in the display panel 420 can be largest. The size of the openings of the remaining components can be small in the order of the diameter (d3) of the opening formed in the polarization member 440, the diameter (d2) of the opening formed in the adhesive member 450, and the diameter (d1) of the opening formed in the opaque member 461. That is, the diameters of the openings can be small in the order of d4>d3>d2>d1.

In various embodiments, the opaque member 461 can be interposed between the adhesive member 450 and the window 403. In various embodiments, the diameter (d1) of the opening formed in the opaque member 461 can be formed least. In various embodiments, the opaque member 461 can overlap with side surfaces of the display panel 420, the polarization member 440, and the adhesive member 450, and the opaque member 461 can prevent and/or reduce a side surface of at least one of the display panel 420, the polarization member 440, and the adhesive member 450 from being acknowledged (e.g., viewable or visible) from the outside. In various embodiments, a width of the opaque member 461 can be formed to include the display panel 420, the polarization member 440, and an opening boundary (or an opening lateral boundary).

In various embodiments, the display panel 420 can include first pixels 421 in a region where the display panel 420 overlaps with the opaque member 461 when viewed from above the window 403. In various embodiments, a display driving circuit (e.g., the display driver IC 230) operably coupled to the display panel 420 can activate some 423 of the first pixels 421. In various embodiments, the display driving circuit can activate some 423 of the first pixels 421, together with second pixels 426 disposed along an outer periphery of the first region 311. In various embodiments, the display driving circuit can activate not only the second pixels 426 but also some 423 of the first pixels 421, so as to prevent and/or reduce a space surrounding the outer periphery of the first region 311 from becoming a dead space. In various embodiments, while activating some 423 of the first pixels 421, the display driving circuit can inactivate remaining some 425 of the first pixels 421. In various embodiments, some 423 of the first pixels 421 can surround remaining some 425 of the first pixels 421. In various embodiments, a region where some 423 of the first pixels 421 are located can be identified in consideration of a tolerance (e.g., a laminate tilt or a print tolerance) which can occur in a manufacturing process of the electronic device 300.

In various embodiments, because activated some 423 of the first pixels 421 can be hidden by the opaque member 461, the display driving circuit can offer a gradation effect using activated some 423 of the first pixels 421 and activated some 427 of the second pixels 426. In a portion, or all, of a masking region, gradation can be displayed.

In various embodiments, the gradation effect can be set to gradually change from one color to another color according to a display region. For example, the gradation effect can include an effect of starting with a dark color from an opening inside and gradually changing into a display displaying color (originally requested by the processor) to an opening outside. In various embodiments, the gradation effect can gradually make bright a luminance displayed by pixels, or gradually make dark. The gradation effect can gradually make thick a color displayed by the pixels, or gradually make blurred.

For example, referring to FIG. 4B, the display driving circuit can offer a gradation effect 471 in a region surrounding the first region 311, using activated some 423 of the first pixels 421 and activated some 427 of the second pixels 426. In various embodiments, the gradation effect 471 can be changed according to a state of the sensor 401. For example, a color of the gradation effect 471 offered while the sensor 401 is in a malfunction state can be different from a color of the gradation effect 471 offered while the sensor 401 is in a normal state. However, an embodiment is not limited to this. In various embodiments, a region where some 427 of the second pixels 426 are located can be identified in consideration of a tolerance which can occur in a manufacturing process of the electronic device 300. For example, some 427 of the second pixels 426 can be located within a specified distance from the center of the opening 405. On the other hand, in various embodiments, the display driving circuit can offer a screen distinct from the gradation effect 471 (or independent of the gradation effect 471) using activated remaining some 428 of the second pixels 426. In a portion, or all, of a masking region, gradation can be displayed.

In various embodiments, the gradation effect can be set to gradually change from one color to another color according to a display region. For example, the gradation effect can include an effect of starting with a dark color from an opening inside and gradually changing into a display displaying color (originally requested by a processor) to an opening outside. In various embodiments, the gradation effect can gradually make bright a luminance displayed by pixels, or gradually make dark. The gradation effect can gradually make thick a color displayed by the pixels, or gradually make blurred.

Referring to FIG. 4C, the display 400 can be disposed beneath the window 403, and can include the opening 405 in the location corresponding to the sensor 401. In various embodiments, the display 400 can include the support member 410, the display panel 420, the polarization member 440, the adhesive member 450, and the opaque member 461. In various embodiments, the sensor 401 can be located in at least a portion of the opening 405 when viewed from above the window 403.

In various embodiments, assuming, by way of non-limiting example, that the openings of the display panel 420, the polarization member 440, the adhesive member 450, and the opaque member 461 are circles, the diameter of the opening formed in the opaque member 461 can be d1, the diameter of the opening formed in the adhesive member 450 can be d2, the diameter of the opening formed in the polarization member 440 can be d3, and the diameter of the opening formed in the display panel 420 can be d4. In various embodiments, the centers of the openings of the display panel 420, the polarization member 440, the adhesive member 450 and the opaque member 461, and the sensor 401, can be disposed substantially on the same axis. In various embodiments, the diameter (d1) of the opening formed in the opaque member 461 can be least among the openings of the display panel 420, the polarization member 440, the adhesive member 450, and the opaque member 461. In various embodiments, the diameter (d4) of the opening of the display panel 420, the diameter (d3) of the opening formed in the polarization member 440, and the diameter (d2) of the opening formed in the adhesive member 450 can be substantially the same as each other.

In various embodiments, the display panel 420 can include the first pixels 421 in the region where the display panel 420 overlaps with the opaque member 461 when viewed from above the window 403. In various embodiments, the display driving circuit (e.g., the display driver IC 230) operably coupled to the display panel 420 can activate some 423 of the first pixels 421. In various embodiments, the display driving circuit can activate some 423 of the first pixels 421, together with the second pixels 426 disposed along an outer periphery of the first region 311. In various embodiments, the display driving circuit can activate not only the second pixels 426 but also some 423 of the first pixels 421, so as to prevent and/or reduce a space surrounding the outer periphery of the first region 311 from becoming a dead space. In various embodiments, while activating some 423 of the first pixels 421, the display driving circuit can inactivate remaining some 425 of the first pixels 421. In various embodiments, some 423 of the first pixels 421 can surround the remaining some 425 of the first pixels 421. In various embodiments, a region where some 423 of the first pixels 421 are located can be identified in consideration of a tolerance (e.g., a laminate tilt or a print tolerance) which can occur in a manufacturing process of the electronic device 300.

In various embodiments, because activated some 423 of the first pixels 421 can be hidden by the opaque member 461, the display driving circuit can offer a gradation effect using activated some 423 of the first pixels 421 and activated some 427 of the second pixels 426. For example, referring to FIG. 4B, the display driving circuit can offer the gradation effect 471 in the region surrounding the first region 311, using activated some 423 of the first pixels 421 and activated some 427 of the second pixels 426. In various embodiments, a region where some 427 of the second pixels 426 are located can be identified in consideration of a tolerance which can occur in a manufacturing process of the electronic device 300. For example, some 427 of the second pixels 426 can be located within a specified distance from the center of the opening 405. On the other hand, in various embodiments, the display driving circuit can offer a screen distinct from the gradation effect 471 (or independent of the gradation effect 471) using activated remaining some 428 of the second pixels 426.

Referring to FIG. 4D, the display 400 can be disposed beneath the window 403, and can include the opening 405 in the location corresponding to the sensor 401. In various embodiments, the display 400 can include the support member 410, the display panel 420, the polarization member 440, the adhesive member 450, and the opaque member 461. In various embodiments, the sensor 401 can be located in at least a portion of the opening 405 when viewed from above the window 403.

In various embodiments, assuming, by way of non-limiting example, that the openings of the display panel 420, the polarization member 440, the adhesive member 450, and the opaque member 461 are circles, the diameter of the opening formed in the opaque member 461 can be d1, the diameter of the opening formed in the adhesive member 450 can be d2, the diameter of the opening formed in the polarization member 440 can be d3, and the diameter of the opening formed in the display panel 420 can be d4. In various embodiments, the centers of the openings of the display panel 420, the polarization member 440, the adhesive member 450 and the opaque member 461, and the sensor 401, can be disposed at one axis. In various embodiments, the diameter (d1) of the opening formed in the opaque member 461 can be least among the openings of the display panel 420, the polarization member 440, the adhesive member 450, and the opaque member 461. In various embodiments, the diameter (d2) of the opening of the adhesive member 450 and the diameter (d3) of the opening of the polarization member 440 can be the same as each other, and the diameter (d2) of the opening of the adhesive member 450 and the diameter (d3) of the opening of the polarization member 440 can be greater than the diameter (d4) of the opening of the display panel 420.

In various embodiments, the display panel 420 can include the first pixels 421 in a region where the display panel 420 overlaps with the opaque member 461 when viewed from above the window 403. In various embodiments, the display driving circuit (e.g., the display driver IC 230) operably coupled to the display panel 420 can activate some 423 of the first pixels 421. In various embodiments, the display driving circuit can activate some 423 of the first pixels 421, together with the second pixels 426 disposed along an outer periphery of the first region 311. In various embodiments, the display driving circuit can activate not only the second pixels 426 but also some 423 of the first pixels 421, so as to prevent and/or reduce a space surrounding the outer periphery of the first region 311 from becoming a dead space. In various embodiments, while activating some 423 of the first pixels 421, the display driving circuit can inactivate remaining some 425 of the first pixels 421. In various embodiments, some 423 of the first pixels 421 can surround the remaining some 425 of the first pixels 421. In various embodiments, a region where some 423 of the first pixels 421 are located can be identified in consideration of a tolerance (e.g., a laminate tilt or a print tolerance) which can occur in a manufacturing process of the electronic device 300.

In various embodiments, because activated some 423 of the first pixels 421 can be hidden by the opaque member 461, the display driving circuit can offer a gradation effect using activated some 423 of the first pixels 421 and activated some 427 of the second pixels 426. For example, referring to FIG. 4B, the display driving circuit can offer the gradation effect 471 in the region surrounding the first region 311, using activated some 423 of the first pixels 421 and activated some 427 of the second pixels 426. In various embodiments, a region where some 427 of the second pixels 426 are located can be identified in consideration of a tolerance which can occur in a manufacturing process of the electronic device 300. For example, some 427 of the second pixels 426 can be located within a specified distance from the center of the opening 405. On the other hand, in various embodiments, the display driving circuit can offer a screen distinct from the gradation effect 471 (or independent of the gradation effect 471) using activated remaining some 428 of the second pixels 426. In a portion, or all, of a masking region, gradation can be displayed.

In various embodiments, the gradation effect can be set to gradually change from one color to another color according to a display region. For example, the gradation effect can include an effect of starting with a dark color from an opening inside and gradually changing into a display displaying color (originally requested by the processor) to an opening outside. In various embodiments, the gradation effect can gradually make bright a luminance displayed by pixels, or gradually make dark. The gradation effect can gradually make thick a color displayed by the pixels, or gradually make blurred.

Figure 4E:
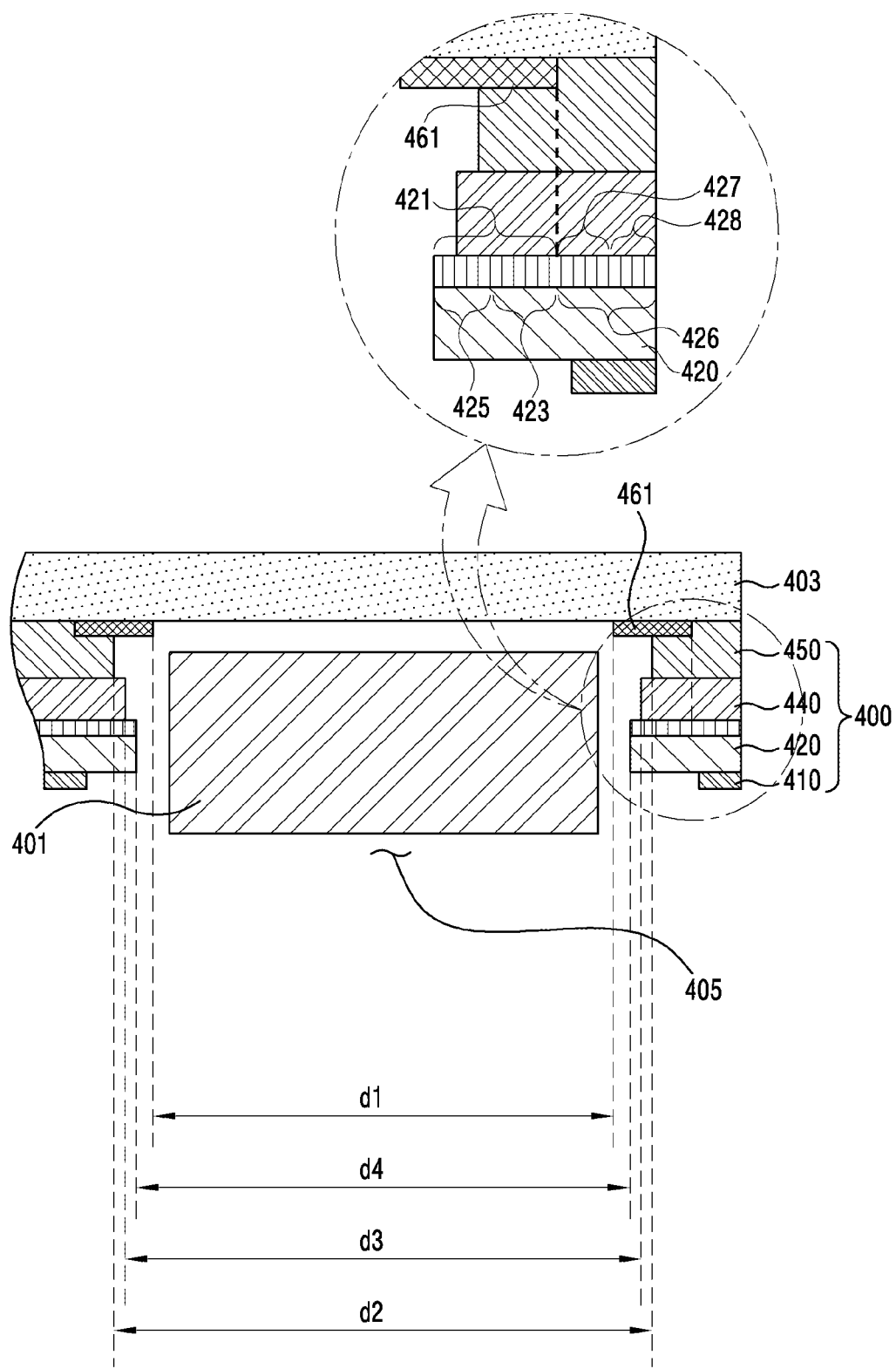
FIG. 4E is a cross-sectional view illustrating an example configuration taken along line A-A' of FIG. 3 according to various embodiments.

FIG. 4E is a cross-sectional view illustrating an example taken along line A-A' of FIG. 3 according to various embodiments.

Referring to FIG. 4E, the display 400 (e.g., the display 310) of various embodiments can be disposed beneath the window 403 (e.g., the front plate 320), and can include the opening 405 (e.g., the first region 311) in the location corresponding to the sensor 401 (e.g., the sensor 303). In various embodiments, the display 400 can include the support member 410, the display panel 420, the polarization member 440, the adhesive member 450, and the opaque member 461. In various embodiments, the support member 410, the display panel 420, the polarization member 440, the adhesive member 450, and the opaque member 461 can be sequentially laminated on the sensor 401. The support member 410, the display panel 420, the polarization member 440, the adhesive member 450, and the opaque member 461 each can include the opening 405 having a different diameter. The sensor 401 can be located in at least a portion of the opening 405 when viewed from above the window 403. In an embodiment, the opaque member 461 can be printed and disposed in the window 403.

In various embodiments, the support member 410 can include a bracket disposed in an electronic device (e.g., the electronic device 300). In various embodiments, the support member 410 can support at least one of the display panel 420, the polarization member 440, the adhesive member 450, and the opaque member 461.

In various embodiments, the display panel 420 can display contents by emitting light towards the window 403. In various embodiments, the polarization member 440 can transmit light received from the window 403, with directionality. In various embodiments, the polarization member 440 can transmit light emitted from the display panel 420, with directionality.

In various embodiments, the adhesive member 450 can attach the polarization member 440 to the window 403. In various embodiments, the adhesive member 450 can include at least one of an optical clear adhesive (OCA) or a pressure sensitive adhesive (PSA) or be formed by at least one of the optical clear adhesive (OCA) or the pressure sensitive adhesive (PSA).

In various embodiments, the display panel 420, the polarization member 440, and the adhesive member 450 can include the opening 405 corresponding to the sensor 401 (or the camera module 180). In various embodiments, the opaque member 461 can be interposed between the window 403 and the adhesive member 450, and be formed along a periphery of the opening of the adhesive member when viewed from above the window 403. In various embodiments, the opaque member 461 can decrease a transmittance in a region disposed along the periphery of the opening of the adhesive member 450. In various embodiments, the opaque member 461 can prevent and/or reduce a bubble able to be formed between the window 403 and the adhesive member 450 from being acknowledged from the outside. In various embodiments, the opaque member 461 can prevent and/or reduce side surfaces of the display panel 420, the polarization member 440, and the adhesive member 450 from being acknowledged externally according to the forming of the opening 405. In various embodiments, the opaque member 460 can include at least one of an ink or an opaque resin, or be formed by at least one of the ink or the opaque resin.

In various embodiments, the openings of the display panel 420, the polarization member 440, the adhesive member 450, and the opaque member 461 can be formed at mutually different sizes. In various embodiments, the openings of the display panel 420, the polarization member 440, the adhesive member 450, and the opaque member 461 can have the mutually same shape. For example, the shape can include a circle, an oval, and/or a polygon.

In various embodiments, the opening 405 of the display panel 420, the polarization member 440, the adhesive member 450, and the opaque member 461 can be formed bigger than the size of the sensor 401 (or the camera module 180). In various embodiments, in response to a size of the sensor 401 being smaller than the diameter of the opening 405, the sensor 401 can be disposed to occupy at least a portion of the opening 405. In various embodiments, the size of the opening 405 can be formed less than the size of the sensor 401 (or the camera module 180).

In various embodiments, the sensor 401 (or the camera module 180) can be located at the same height as respective layers (e.g., the display panel 420, the polarization member 440, and the adhesive member 450) of the display 400.

In various embodiments, at least one of the sensor 401 and a camera module 480 (e.g., the camera module 180 of FIG. 1) can be disposed between the respective layers (e.g., the display panel 420, the polarization member 440, and the adhesive member 450) of the display 400.

In various embodiments, the center of the opening 405 can be the same as the center of the sensor 401 (or the camera module 180).

In various embodiments, assuming that shapes of the openings of the display panel 420, the polarization member 440, the adhesive member 450, and the opaque member 461 are circles, the diameter of the opening formed in the opaque member 461 can be d1, the diameter of the opening formed in the adhesive member 450 can be d2, the diameter of the opening formed in the polarization member 440 can be d3, and the diameter of the opening formed in the display panel 420 can be d4. In various embodiments, the centers of the openings of the display panel 420, the polarization member 440, the adhesive member 450 and the opaque member 461, and the sensor 401, can be disposed in one axis. In various embodiments, the diameter (d1) of the opening formed in the opaque member 461 can be least among the openings of the display panel 420, the polarization member 440, the adhesive member 450, and the opaque member 461. Sizes of the openings of the remaining components can be small in the order of the diameter (d4) of the opening of the display panel 420, the diameter (d3) of the opening formed in the polarization member 440, and the diameter (d2) of the opening formed in the adhesive member 450.

In various embodiments, the centers of the openings of the display panel 420, the polarization member 440, the adhesive member 450 and the opaque member 461, and the sensor 401, can be disposed in one axis. The diameter of the opening formed in the display panel 420, d4, can be largest. Sizes of the openings of the remaining components can be small in the order of the diameter (d3) of the opening formed in the polarization member 440, the diameter (d2) of the opening formed in the adhesive member 450, and the diameter (d1) of the opening formed in the opaque member 461. That is, the diameters of the openings can become small in the order of d4>d3>d2>d1.

In various embodiments, the opaque member 461 can be interposed between the adhesive member 450 and the window 403. In various embodiments, the diameter (d1) of the opening formed in the opaque member 461 can be formed least. In various embodiments, the opaque member 461 can overlap with side surfaces of the display panel 420, the polarization member 440, and the adhesive member 450, and the opaque member 461 can prevent and/or reduce a side surface of at least one of the display panel 420, the polarization member 440, and the adhesive member 450 from being acknowledged from the outside. In various embodiments, a width of the opaque member 461 can be formed to include the display panel 420, the polarization member 440, and an opening boundary (or an opening lateral boundary).

In various embodiments, the display panel 420 can include the first pixels 421 in a region where the display panel 420 overlaps with the opaque member 461 when viewed from above the window 403. In various embodiments, the display driving circuit (e.g., the display driver IC 230) operably coupled to the display panel 420 can activate some 423 of the first pixels 421. In various embodiments, the display driving circuit can activate some 423 of the first pixels 421, together with the second pixels 426 disposed along an outer periphery of the first region 311. In various embodiments, the display driving circuit can activate not only the second pixels 426 but also some 423 of the first pixels 421, so as to prevent and/or reduce a space surrounding the outer periphery of the first region 311 from becoming a dead space. In various embodiments, while activating some 423 of the first pixels 421, the display driving circuit can inactivate remaining some 425 of the first pixels 421. In various embodiments, some 423 of the first pixels 421 can surround the remaining some 425 of the first pixels 421. In various embodiments, a region where some 423 of the first pixels 421 are located can be identified in consideration of a tolerance (e.g., a laminate tilt or a print tolerance) which can occur in a manufacturing process of the electronic device 300.

In various embodiments, because activated some 423 of the first pixels 421 can be hidden by the opaque member 461, the display driving circuit can offer a gradation effect using activated some 423 of the first pixels 421 and activated some 427 of the second pixels 426. In a portion, or all, of a masking region, gradation can be displayed.

In various embodiments, the gradation effect can be set to gradually change from one color to another color according to a display region. For example, the gradation effect can include an effect of starting with a dark color from an opening inside and gradually changing into a display displaying color (originally requested by the processor) to an opening outside. In various embodiments, the gradation effect can gradually make bright a luminance displayed by pixels, or gradually make dark. The gradation effect can gradually make thick a color displayed by the pixels, or gradually make blurred.

Figure 5:
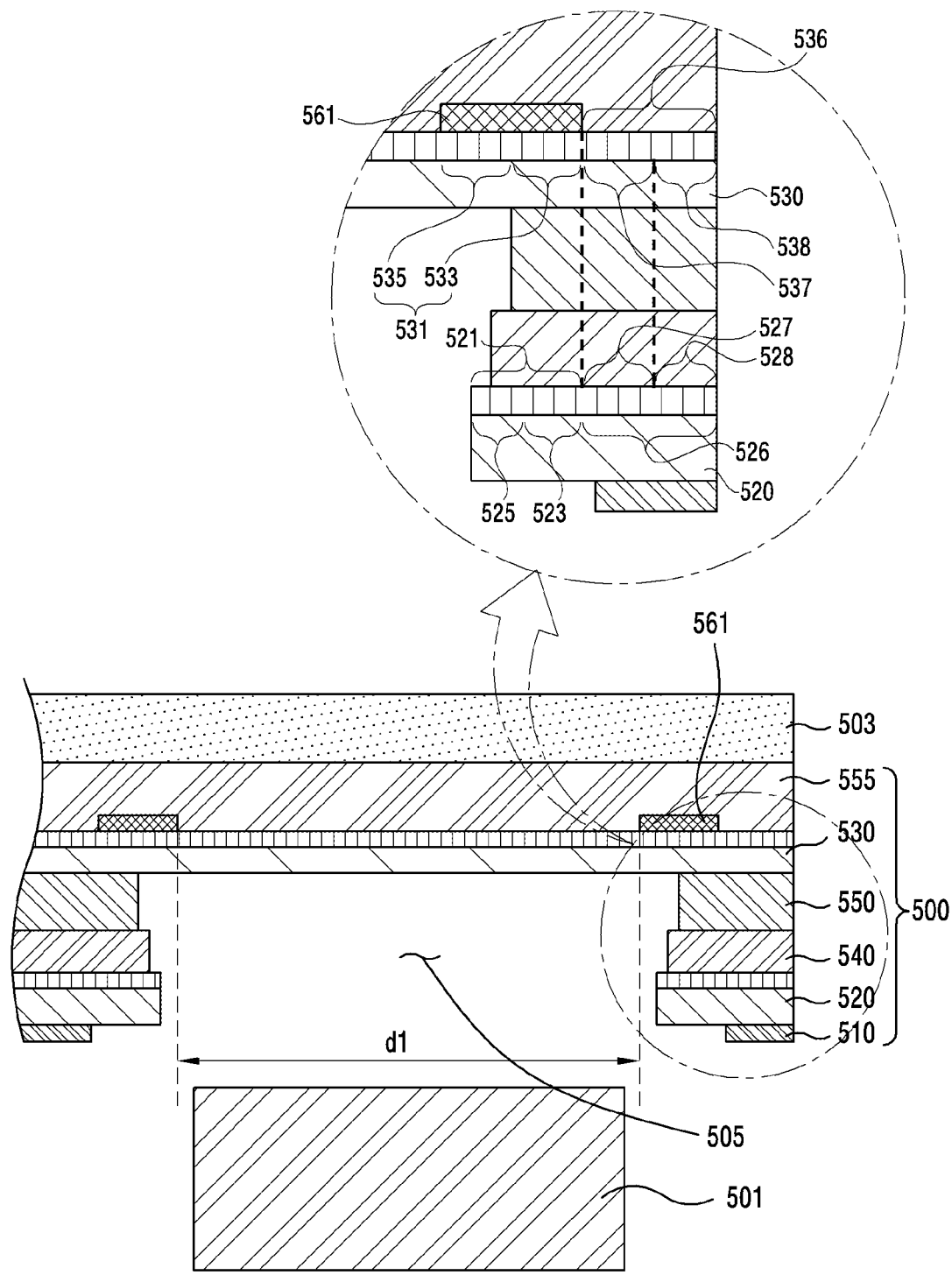
FIG. 5 is a cross-sectional view illustrating an example configuration taken along line A-A' of FIG. 3 according to various embodiments.

FIG. 5 is a cross-sectional view illustrating an example taken along line A-A' of FIG. 3 according to various embodiments.

Referring to FIG. 5, a display 500 (e.g., the display 400) can be disposed beneath a window 503 (e.g., the window 403), and can include an opening 505 (e.g., the opening 405) in a location corresponding to a sensor 501 (e.g., the sensor 401). In various embodiments, the display 500 can include a support member 510 (e.g., the support member 410), a display panel 520 (e.g., the display panel 420), a polarization member 540 (e.g., the polarization member 440), a first adhesive member (e.g., including an adhesive material) 550, a second adhesive member (e.g., including an adhesive material) 555, a touch panel 530, and an opaque member (e.g., including an opaque material) 561 (e.g., the opaque member 461). In various embodiments, the support member 510, the display panel 520, the polarization member 540, the first adhesive member 550, the touch panel 530, the opaque member 561, and the second adhesive member 555 can be sequentially laminated on the sensor 501. In various embodiments, the support member 510, the display panel 520, the polarization member 540, and the first adhesive member 550 each can include the opening 505 having a different diameter. In various embodiments, the sensor 501 can be located in at least a portion of the opening 503 when viewed from above the window 503. However, an embodiment is not limited to this, and the support member 510, the display panel 520, the polarization member 540, and the first adhesive member 550 can include the opening 505 having the same diameter as well.

In various embodiments, the touch panel 530 can include an opening corresponding to the sensor 501, and a size of the opening can be substantially the same as an inner circumference of the opaque member 561. However, an embodiment is not limited to this. In various embodiments, the support member 501, the display panel 520, the polarization member 540, and the first adhesive member 550 in the display 500 can be the same as or be similar with the support member 410, the display panel 420, the polarization member 440, and the adhesive member 450 in the display 400 of FIGS. 4A, 4C, and 4D, and a repeated description is omitted.

In various embodiments, the touch panel 530 can be an exterior type (e.g., an add-on type). In various embodiments, the touch panel 530 can be disposed over the display panel 520 and the polarization member 540. In various embodiments, the touch panel 530 can be attached with the window 503 by the second adhesive member 555. In various embodiments, the touch panel 530 can include patterns formed on a transparent substrate. In various embodiments, the opaque member 561 can be disposed on the touch panel 530. In various embodiments, the opaque member 561 can have a width to include an opening boundary of the display panel 520, the polarization member 540, and the first adhesive member 550. In various embodiments, the opaque member 561 can be formed on the touch panel 530 in a region including a boundary of the opening of the display panel 520. In various embodiments, the opaque member 561 can be formed between the opening of the display panel 520 and an activation region.

In various embodiments, the opaque member 561 can prevent and/or reduce a boundary of an opening (e.g., the opening 505) formed by components of the display 500 from being acknowledged (or viewable) from the outside.

In various embodiments, the display panel 520 can include first pixels 521 in a region where the display panel 520 overlaps with the opaque member 561 when viewed from above the window 503. In various embodiments, a display driving circuit (e.g., the display driver IC 230) operably coupled to the display panel 520 can activate some 523 of the first pixels 521. In various embodiments, the display driving circuit can activate some 523 of the first pixels 521, together with second pixels 526 disposed along an outer periphery of the first region 311. In various embodiments, the display driving circuit can activate not only the second pixels 526 but also some 523 of the first pixels 521, so as to prevent and/or reduce a space surrounding the outer periphery of the first region 311 from becoming a dead space. In various embodiments, while activating some 523 of the first pixels 521, the display driving circuit can inactivate remaining some 525 of the first pixels 521. In various embodiments, some 523 of the first pixels 521 can surround the remaining some 525 of the first pixels 521. In various embodiments, a region where some 523 of the first pixels 521 are located can be identified in consideration of a tolerance (e.g., a laminate tilt or a print tolerance) which can occur in a manufacturing process of the electronic device 300.

In various embodiments, because activated some 523 of the first pixels 521 can be hidden by the opaque member 561, the display driving circuit can offer a gradation effect using activated some 523 of the first pixels 521 and activated some 527 of the second pixels 526. For example, referring to FIG. 4B, the display driving circuit can offer the gradation effect 471 in the region surrounding the first region 311, using activated some 523 of the first pixels 521 and activated some 527 of the second pixels 526. In various embodiments, a region where some 527 of the second pixels 526 are located can be identified in consideration of a tolerance which can occur in a manufacturing process of the electronic device 300. For example, some 527 of the second pixels 526 can be located within a specified distance from the center of the opening 505. On the other hand, in various embodiments, the display driving circuit can offer a screen distinct from the gradation effect 471 (or independent of (independent of) the gradation effect 471) using activated remaining some 528 of the second pixels 526.

In various embodiments, the touch panel 530 can include a sensor pattern 531 in a region where the display panel 520 overlaps with the opaque member 561 when viewed from above the window 503. In various embodiments, because the sensor pattern 531 is hidden by the opaque member 561, the sensor pattern 531 can be inactivated while some 523 of the first pixels 521 are activated. In accordance with embodiments, a portion 533 of the sensor pattern 531 can be activated, unlike the remaining portion 535 of the patterns, for the sake of a touch input received in a region surrounding the opaque member 561 as well. However, an embodiment is not limited to this.

In various embodiments, the touch panel 530 can include sensor patterns 536 disposed along an outer periphery of the first region 311 when viewed from above the window 503. In various embodiments, the portion 537 of the sensor patterns 536 can be inactivated while the remaining portion 538 of the sensor patterns 536 are activated. For example, in response to offering a gradation effect using activated some 523 of the first pixels 521 and activated some 527 of the second pixels 526, the portion 537 of the sensor patterns 536 can be inactivated. Because the region offering the gradation effect can include a non-executable area, the portion 537 of the sensor patterns 536 can be inactivated while the gradation effect is offered. However, an embodiment is not limited to this.

For example, in response to activating the portion 537 of the sensor patterns 536 while offering the gradation effect using activated some 523 of the first pixels 521 and activated some 527 of the second pixels 526, the portion 537 of the sensor patterns 536 can be used to offer an input for the sensor 505. For example, the portion 537 of the sensor patterns 536 can be used to receive an input for activating the sensor 505.

Though not illustrated in FIG. 5, the electronic device 300 of various embodiments can further include, for example, an electro-magnetic resonance (EMR) panel. The electronic device 300 can set a resonance circuit of the EMR panel disposed along an outer periphery of the first region 311 to the enable state for the sake of a stylus pen interlocked with the electronic device 300. In various embodiments, the resonance circuit set to the enable state can be used to charge a rechargeable battery included in the stylus pen, while the gradation effect is offered. In various embodiments, while charging through the resonance circuit, the gradation effect can be offered (as an indicator). In various embodiments, the resonance circuit set to the enable state can be used to change a color of a line or dot drawn on the second region 313 of the display 310 by the stylus pen, on the basis of a contact of the stylus pen on around a periphery offering the gradation effect as well. In various embodiments, while the resonance circuit set to the enable state is used, a state of the gradation effect can be changed to represent offering a function related to the stylus pen. For example, while the stylus pen is charged, the gradation effect can be displayed in a specified color. However, an embodiment is not limited to this.

Figure 6A:
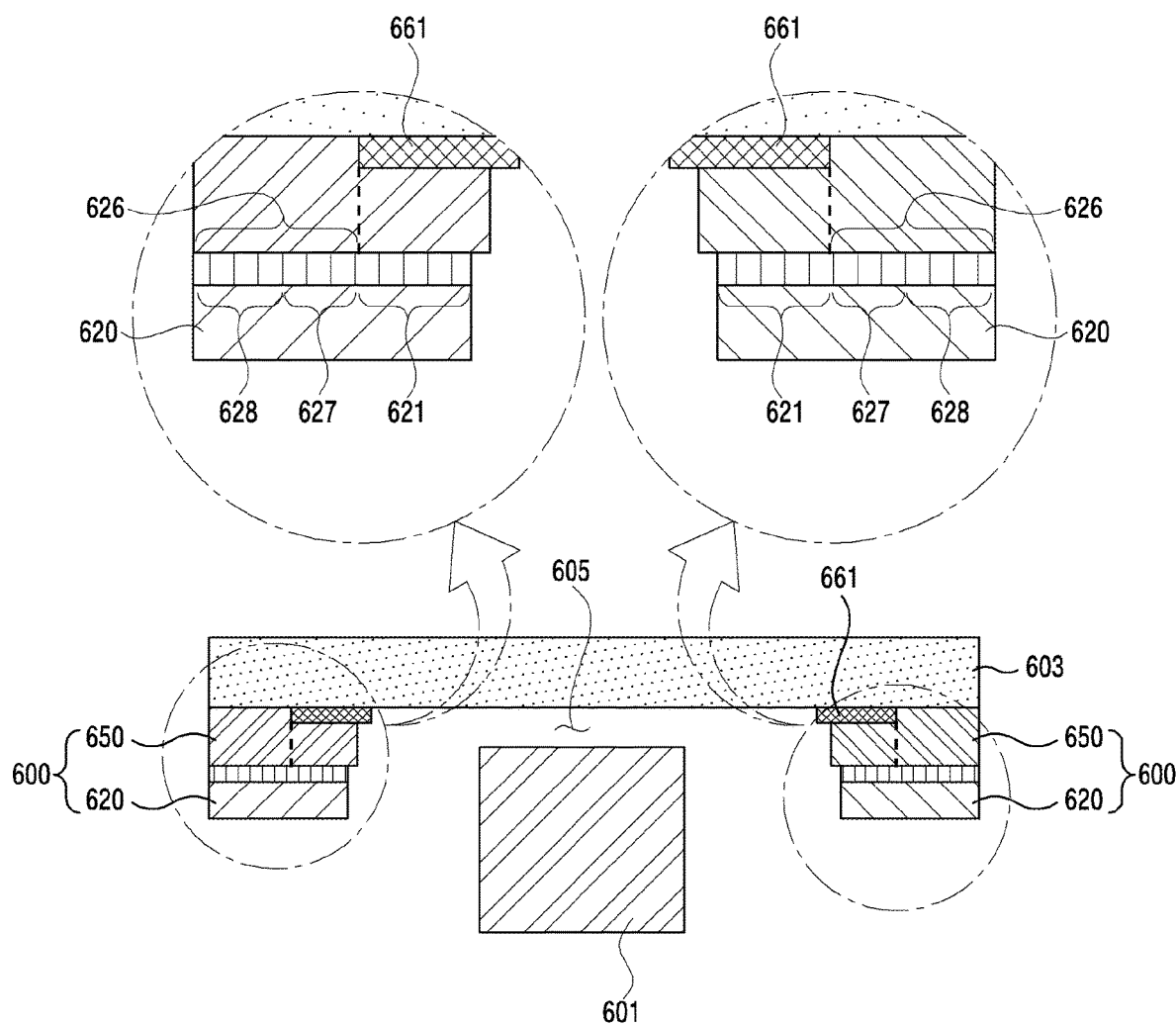
FIG. 6A is a cross-sectional view illustrating an example configuration taken along line A-A' of FIG. 3 according to various embodiments.
Figure 6B:
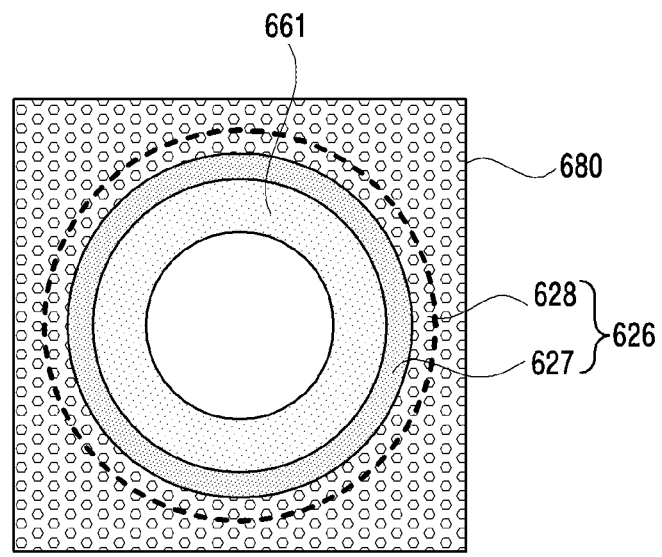
FIG. 6B is a diagram illustrating an example of images of a first region of an electronic device and a region adjacent to the first region according to various embodiments.
Figure 6B:
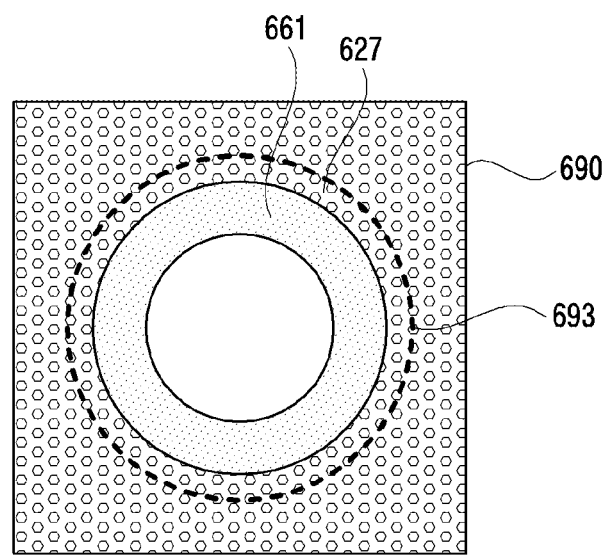

FIG. 6A is a cross-sectional view illustrating an example taken along line A-A' of FIG. 3 according to various embodiments. FIG. 6B is a diagram illustrating an example of images of a first region of an electronic device and a region adjacent to the first region according to various embodiments.

Referring to FIG. 6A, a display 600 (e.g., the display 400) can be disposed beneath a window 603 (e.g., the window 403), and can include an opening 605 (e.g., the opening 405) in a location corresponding to the sensor 601 (e.g., the sensor 401). In various embodiments, the display 600 can include a display panel 620 (e.g., the display panel 420), an adhesive member 650 (e.g., the adhesive member 450), and an opaque member 661. Although not illustrated in FIG. 6A, the display 600 can further include a support member (e.g., the support member 410) disposed beneath the display panel 620, and/or a polarization member (e.g., the polarization member 440) interposed between the display panel 620 and the adhesive member 650.

In various embodiments, the display panel 620, the adhesive member 650, and the opaque member 661 can be sequentially laminated. In various embodiments, the display panel 620, the adhesive member 650, and the opaque member 661 each can include the opening 605 having a different diameter.

In various embodiments, the display panel 620 can include first pixels 621 in a region where the display panel 620 overlaps with the opaque member 661 when viewed from above the window 603. In various embodiments, because the first pixels 621 are hidden by the opaque member 661, the first pixels 621 can be inactivated. In various embodiments, the display panel 620 can include second pixels 626 (e.g., pixels disposed along an outer periphery of the first region 311) in another region surrounding the region where the display panel 620 overlaps with the opaque member 661. In various embodiments, some 627 of the second pixels 626 can be set to a disable state until the manufacturing of the electronic device 300 is completed in consideration of a tolerance (e.g., a laminate tilt or a print tolerance) which can occur in a manufacturing process of the electronic device 300. For example, some 627 of the second pixels 626 can be set to the disable state together with the first pixels 621. For example, some 627 of the second pixels 626 can be set to the disable state unlike remaining some 628 of the second pixels 626 set to an enable state. Because a region disposing some 627 of the second pixels 626 set to the disable state can offer a dead space, the electronic device 300 can store an image for changing some 627 of the second pixels 626 into the enable state. For example, the image can include a vector image. In various embodiments, the image can be at least partially stored in a memory (e.g., the memory 130) external to a display driving circuit (e.g., the display driver IC 230). In various embodiments, the image can be at least partially stored in the memory (e.g., the memory 233) internal to the display driving circuit.

In various embodiments, the image can be acquired by photographing a first region of the display panel 620 at least partially overlapping with the opaque member 661, using an external camera of a state of vertically facing a surface of the window 603 seen from the outside. In various embodiments, the image can be an image of the dead space. In various embodiments, the image can be an image acquired after the completion of the manufacturing of the electronic device 300 and stored in the electronic device 300. In various embodiments, the image can be at least partially stored in the electronic device 300, in order to eliminate or decrease the dead space. In various embodiments, the image can be an image which is used in response to displaying a screen using the display driving circuit (e.g., the display driver IC 230).

For example, referring to FIG. 6B, an image 680 can be the image. For example, the image 680 can be an image of the first region 311 and a region adjacent to the first region 311. As being capable of confirming through the image 680, some 627 of the second pixels 626 disposed in a region surrounding the opaque member 661 can be inactivated while remaining some 628 of the second pixels 626 are activated.

FIG. 6B illustrates that a portion of one pixel can be inactivated, but the image 680 is not limited to this. For example, in response to the electronic device 300 performing control by the unit of one pixel, at least one pixel included in some 627 of the second pixels 626 and disposed along a perimeter of a circle can be activated unlike the illustration of FIG. 6B, and at least one another pixel disposed along the perimeter of the circle included in remaining some 628 of the second pixels 626 can be inactivated unlike the illustration of FIG. 6B as well.

In various embodiments, the display driving circuit or a processor (e.g., the processor 120) of the electronic device 300 can identify that it is required to change some 627 of the second pixels 626 from the disable state to the enable state on the basis of the image 680. Below, the display driving circuit will be mentioned as an operating subject, but this is for description's convenience. At least some of operations described below can be performed by the processor as well.

In various embodiments, the display driving circuit can extract some 627 of the second pixels 626 from the second pixels 626 on the basis of the image 680, and set some 627 of the second pixels 626 to the enable state converted from the disable state. For example, the display driving circuit can activate pixels (e.g., the second pixels 626) disposed outside of the opaque member 661 when viewed from above the window 603. For example, the display driving circuit can activate some 627 of the second pixels 626, on the basis of synthesizing the image 680 or a vector image acquired from the image 680 and an image of a screen which will be displayed. In an embodiment, the display driving circuit can activate some 627 of the second pixels 626, to synthesize the image 680 and the image of the screen which will be displayed. In an embodiment, the display driving circuit can activate some 627 of the second pixels 626, to synthesize the vector image acquired from the image 680 and the image of the screen which will be displayed.

In various embodiments, an image 690 can be acquired in response to after activating some 627 of the second pixels 626, photographing a first region 693 of the display panel 620 at least partially overlapping with the opaque member 661 using an external camera of a state of vertically facing a surface of the window 603 seen from the outside. As being capable of confirming through the image 690, some 627 of the second pixels 626 can be activated like remaining some 628 of the second pixels 626. In other words, the electronic device 300 of various embodiments can minimize or eliminate a dead space around the first region 311.

Figure 7A:
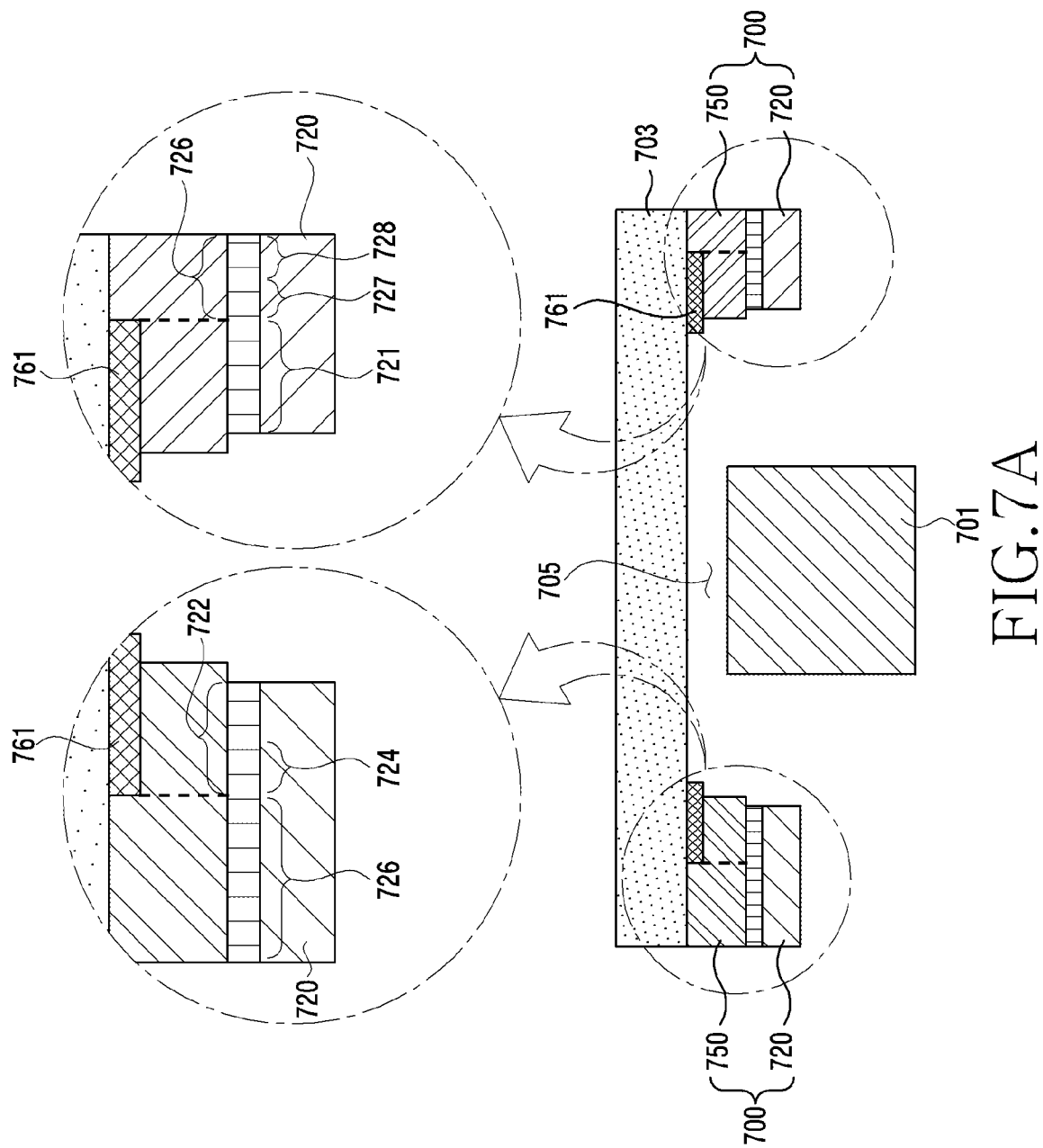
FIG. 7A is a cross-sectional view illustrating an example configuration taken along line A-A' of FIG. 3 according to various embodiments.
Figure 7B:
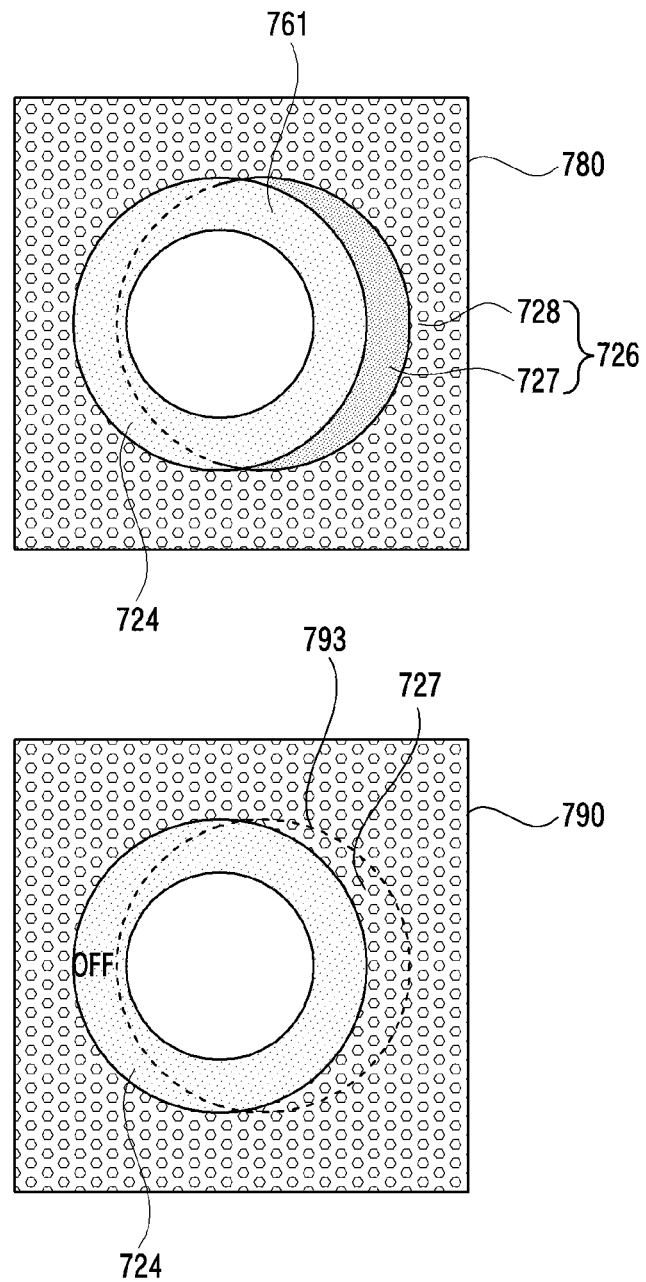
FIG. 7B is a diagram illustrating an example of images of a first region of an electronic device and a region adjacent to the first region according to various embodiments.

FIG. 7A is a cross-sectional view illustrating an example taken along line A-A' of FIG. 3 according to various embodiments. FIG. 7B illustrates an example of images of a first region of an electronic device and a region adjacent to the first region according to various embodiments.

Referring to FIG. 7A, a display 700 (e.g., the display 400) can be disposed beneath a window 703 (e.g., the window 403), and can include an opening 705 (e.g., the opening 405) in a location corresponding to the sensor 701 (e.g., the sensor 401). In various embodiments, the display 700 can include a display panel 720 (e.g., the display panel 420), an adhesive member 750 (e.g., the adhesive member 450), and an opaque member 761. Although not illustrated in FIG. 7A, the display 700 can further include a support member (e.g., the support member 410) disposed beneath the display panel 720, and/or a polarization member (e.g., the polarization member 440) interposed between the display panel 720 and the adhesive member 750.

In various embodiments, the display panel 720, the adhesive member 750, and the opaque member 761 can be sequentially laminated. In various embodiments, the display panel 720, the adhesive member 750, and the opaque member 761 each can include the opening 705 having a different diameter.

In various embodiments, the display panel 720 can include first pixels 721 and second pixels 722 in a region where the display panel 720 overlaps with the opaque member 761 when viewed from above the window 703. The first pixels 721 and the second pixels 722 can be formed at a mutually different size.

In various embodiments, because the first pixels 721 are hidden by the opaque member 761, the first pixels 721 can be inactivated. In various embodiments, the display panel 720 can include third pixels 726 (e.g., pixels disposed along an outer periphery of the first region 311) in another region surrounding the region where the display panel 720 overlaps with the opaque member 761. In various embodiments, some 727 of the third pixels 726 can be set to a disable state until the manufacturing of the electronic device 300 is completed in consideration of a tolerance which can occur in a manufacturing process of the electronic device 300. For example, some 727 of the third pixels 726 can be set to the disable state, together with the first pixels 721. For example, some 727 of the third pixels 726 can be set to the disable state unlike remaining some 728 of the third pixels 726 set to an enable state. Because a region disposing some 727 of the third pixels 726 set to the disable state can offer a dead space, the electronic device 300 can store an image for changing some 727 of the third pixels 726 into the enable state. For example, the image can include a vector image. In various embodiments, the image can include a bitmap image or an image of a compressed form.

In various embodiments, the image can be at least partially stored in a memory (e.g., the memory 130) external to a display driving circuit (e.g., the display driver IC 230). In various embodiments, the image can be at least partially stored in a memory (e.g., the memory 233) internal to the display driving circuit.

In various embodiments, the image can be acquired by photographing a first region of the display panel 720 at least partially overlapping with the opaque member 761, using an external camera of a state of vertically facing a surface of the window 703 seen from the outside. In various embodiments, the image can be an image of the dead space. In various embodiments, the image can be an image acquired after the completion of the manufacturing of the electronic device 300 and stored in the electronic device 300. In various embodiments, the image can be stored in the electronic device 300, in order to eliminate or decrease the dead space. In various embodiments, the image can be an image which is used in response to displaying a screen using the display driving circuit (e.g., the display driver IC 230).

In various embodiments, some 724 of the second pixels 722 disposed in the region where the display panel 720 overlaps with the opaque member 761 can be set to the enable state by the tolerance provided in the manufacturing process of the electronic device 300. In various embodiments, because some 724 of the second pixels 722 are hidden by the opaque member 761, it can be required in the electronic device 300 to convert the enable state of some 724 of the second pixels 722 into the disable state. The electronic device 300 can store an image for changing some 724 of the second pixels 722 into the disable state. For example, the image can include a vector image. In various embodiments, the image can be stored in the memory (e.g., the memory 130) external to the display driving circuit (e.g., the display driver IC 230). In various embodiments, the image can be stored in the memory (e.g., the memory 233) internal to the display driving circuit.

In various embodiments, the image can be acquired by photographing a first region of the display panel 720 partially overlapping with the opaque member 761, using an external camera of a state of vertically facing a surface of the window 703 seen from the outside. In various embodiments, the image can be an image acquired after the completion of the manufacturing of the electronic device 300 and stored in the electronic device 300. In various embodiments, the image can be an image which is used in response to displaying a screen using the display driving circuit (e.g., the display driver IC 230).

For example, referring to FIG. 7B, an image 780 can be the image. For example, the image 780 can be an image of the first region 311 and a region adjacent to the first region 311. As being capable of confirming through the image 780, some 727 of the third pixels 726 disposed in a region surrounding the opaque member 761 can be inactivated while remaining some 728 of the third pixels 726 are activated.

FIG. 7B illustrates that a portion of one pixel can be inactivated, but the image 780 is not limited to this. For example, in response to the electronic device 300 performing control by the unit of one pixel, at least one pixel included in some 727 of the third pixels 726 and disposed along a perimeter of a circle can be activated unlike the illustration of FIG. 7B, and at least one another pixel disposed along the perimeter of the circle included in remaining some 728 of the third pixels 726 can be inactivated unlike the illustration of FIG. 7B as well.

In various embodiments, the display driving circuit can identify that it is required to change some 727 of the third pixels 726 from the disable state from the enable state on the basis of the image 780.

On the other hand, as being capable of confirming through the image 780, some 724 of the second pixels 722 disposed in the region where the display panel 720 overlaps with the opaque member 761 can be activated despite being hidden by the opaque member 761. In various embodiments, the display driving circuit can identify that it is required to change some 724 of the second pixels 722 from the enable state from the disable state on the basis of the image 780. For example, the display driving circuit can identify that it is required to change some 724 of the second pixels 722 from the enable state to the disable state, on the basis of the disposing of some 727 of the third pixels 726 identified on the basis of the image 780.

In various embodiments, the display driving circuit can extract the third pixels 726 and the second pixels 722 on the basis of the image 780. The display driving circuit can extract some 727 of the third pixels 726 from the third pixels 726, and extract some 724 of the second pixels 722 from the second pixels 722. The display driving circuit can set some 727 of the third pixels 726 to the enable state, and set some 724 of the second pixels 722 to the disable state. For example, the display driving circuit can activate pixels (e.g., the third pixels 726) disposed outside of the opaque member 661 when viewed from above the window 703 and inactivate pixels (e.g., the first pixels 721 and the second pixels 722) disposed inside of the opaque member 661 when viewed from above. For example, on the basis of synthesizing the image 780 or a vector image acquired from the image 780 and an image of a screen which will be displayed, the display driving circuit can activate some 727 of the third pixels 726 and inactivate some 724 of the second pixels 722.

In various embodiments, an image 790 can be acquired in response to, after activating some 727 of the third pixels 726 and inactivating some 724 of the second pixels 722, photographing a region including the first region 793 of the display panel 720 partially overlapping with the opaque member 761, using an external camera of a state of vertically facing a surface of the window 703 seen from the outside.

In various embodiments, in various embodiments, a misalign region can be extracted on the basis of a photographed image.

As being capable of confirming through the image 790, the electronic device 300 of various embodiments can minimize or eliminate and/or reduce a dead space around the first region 311. As being capable of confirming through the image 790, the electronic device 300 of various embodiments can minimize or prevent and/or reduce the activating of the pixels disposed under the opaque member 761.

Figure 8:
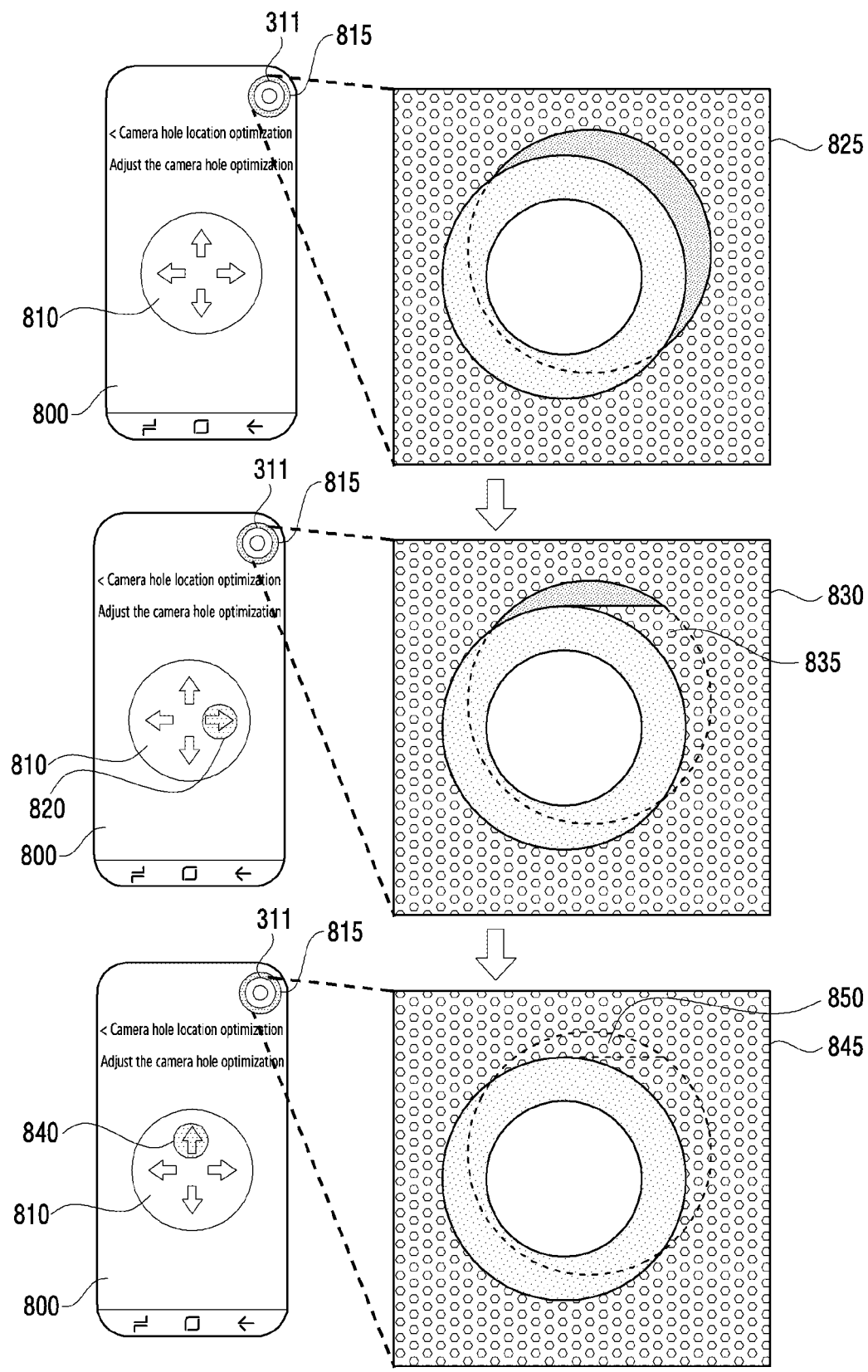
FIG. 8 a diagram illustrating an example of eliminating and/or reducing a dead space at least partially surrounding a first region based on a user input according to various embodiments.

FIG. 8 is a diagram illustrating an example of eliminating and/or reducing a dead space at least partially surrounding a first region based on a user input according to various embodiments.

Referring to FIG. 8, a processor (e.g., the processor 120) of the electronic device 300 can display a user interface 800 through the display 310. In various embodiments, the user interface 800 can include an executable object 810 for activating pixels disposed in a dead space surrounding at least a portion of the first region 311 and inactivating pixels hidden by an opaque member (e.g., the opaque member 661 or the opaque member 761). Although not illustrated in detail in FIG. 8, a visual affordance 815 having at least one color for easily recognizing the dead space in the region surrounding the first region 311 can be further included in the user interface 800.

In various embodiments, the processor can receive an input 820 for the executable object 810. For example, the input 820 can be an input for a visual element representing a right arrow included in the executable object 810. In various embodiments, in response to receiving the input 820, the processor can convert a state 825 into a state 830. In an embodiment, in response to pressing a right arrow key, a portion of a region of a disable state seen at the right side of the opaque member can be activated. In an embodiment, in response to pressing a left arrow key, a portion of the region of the disable state seen at the right side of the opaque member can be activated. In an embodiment, in response to pressing the left arrow key, a portion of a region of the disable state seen at the left side of the opaque member can be activated. In response to pressing the right arrow key, a portion of the region of the disable state seen at the left side of the opaque member can be activated.

In various embodiments, in the second state 830, the processor can activate pixels of a region 835 which is in the disable state in the first state 825. The processor can receive an input 840 for the executable object 810, in the second state 830. For example, the input 840 can be an input for a visual element indicating an up arrow included in the executable object 810. In various embodiments, in response to receiving the input 840, the processor can convert the second state 830 into a third state 845. In various embodiments, in the third state 845, the processor can activate pixels of a region 850 which is in the disable state in the first state 825 and the second state 830.

FIG. 8 illustrates that a portion of one pixel can be inactivated, but the first state 825, the second state 830, and the third state 845 are not limited to this. For example, in response to the electronic device 300 performing control by the unit of one pixel, activated at least one pixel disposed along a perimeter of a circle can be inactivated unlike the illustration of FIG. 8, and inactivated at least one another pixel disposed along the perimeter of the circle can be activated unlike the illustration of FIG. 8 as well.

In various embodiments, the activation of one pixel can be changed based on a user input. For example, in response to the electronic device 300 performing control by the unit of one pixel, activated one pixel disposed along the perimeter of the circle can be inactivated based on a user input. Inactivated one another pixel disposed along the perimeter of the circle can be activated based on the user input as well.

In various embodiments, the activation of a plurality of pixels can be changed based on a user input. For example, in response to the electronic device 300 performing control by the unit of the plurality of pixels, an activated plurality of pixels disposed along the perimeter of the circle can be inactivated based on the user input. An inactivated plurality of other pixels disposed along the perimeter of the circle can be activated based on the user input as well.

As described above, the electronic device 300 of various embodiments can offer a service of controlling pixels of a region adjacent to a sensor disposed in the display 310, using a user interface displayed on the display 310. Through the offering of this service, the electronic device 300 of various embodiments can offer reinforced visibility.

An electronic device (e.g., the electronic device 300) of various example embodiments as described above can include a window (e.g., the window 403) including a first region, a display panel (e.g., the display panel 420) facing one surface of the window, and including a first opening, an adhesive member comprising an adhesive material (e.g., the adhesive member 450) interposed between the window and the display panel, and including a second opening, an opaque member comprising an opaque material (e.g., the opaque member 461) disposed along a periphery of the first region when viewed from above the window, a sensor (e.g., the sensor 401) disposed under the window and at least partially visible through the first opening and the second opening, and a display driving circuit (e.g., the display driver IC 230) operably coupled with the display panel, wherein the display driving circuit can be configured to activate some of the pixels of the display panel disposed in a region where the display panel overlaps the opaque member when viewed from above the window.

In various example embodiments, remaining pixels of the some of the pixels can be inactivated while some of the pixels are activated.

In various example embodiments, some of the pixels can surround the remaining some of the pixels.

In various example embodiments, the display driving circuit can be configured to activate some of the pixels to provide a gradation effect.

In various example embodiments, some of the pixels can provide the gradation effect together with some of the other pixels of the display panel that surround the opaque member when viewed from above the window.

In various example embodiments, some of the other pixels can be located within a specified distance from the center of the first region.

In various example embodiments, remaining some of the other pixels can provide a screen independent of the gradation effect.

In various example embodiments, a size of the second opening can be less than a size of the first opening.

In various example embodiments, the sensor can include at least one of a sensor configured to emit light towards the outside, a sensor configured to receive light from the outside, a sensor configured to output a sound towards the outside, or a sensor configured to receive a sound from the outside.

In various example embodiments, the adhesive material can include an optical clear adhesive (OCA).

In various example embodiments, the opaque member can be interposed between the window and the display panel to hide a wire for driving the display panel.

In various example embodiments, the opaque material can include an opaque resin or an opaque ink.

In various example embodiments, the electronic device can further include a transparent touch panel (e.g., the touch panel 530) interposed between the window and the adhesive member, and the opaque member can be interposed between the touch panel and the window.

In various example embodiments, touch patterns of the touch panel located over some of the pixels can be inactivated while some of the pixels are activated.

In various example embodiments, the electronic device can further include a support (e.g., the support member 410) disposed opposite to the window, including a third opening, and supporting at least one of the display panel, the adhesive member, or the opaque member.

An electronic device (e.g., the electronic device 300) of various example embodiments as described above can include a window (e.g., the window 603) including a first region, a display panel (e.g., the display panel 620) facing one surface of the window, and including a first opening, an adhesive member comprising an adhesive material (e.g., the adhesive member 650) interposed between the window and the display panel, and including a second opening, an opaque member comprising an opaque material (e.g., the opaque member 661) disposed along a periphery of the first region when viewed from above the window, a sensor (e.g., the sensor 601) disposed under the window and at least partially visible through the first opening and the second opening, and a display driving circuit (e.g., the display driver IC 230) operably coupled with the display panel, and the display driving circuit can be configured to activate at least one pixel disposed within a projection of the opaque member when viewed from above the window among pixels of the display panel and inactivate at least one other pixel disposed outside the projection of the opaque member when viewed from above the window among the pixels, based on an image of a second region of the display panel having a shape corresponding to an outer periphery of the opaque member and partially overlapping the opaque member when viewed from above, in a state of vertically facing another surface of the window.

In various example embodiments, the image can include a vector image.

In various example embodiments, the electronic device can further include a memory (e.g., the memory 130) external to the display driving circuit configured to store the image.

In various example embodiments, the electronic device can further include a memory (e.g., the memory 233) within the display driving circuit configured to store the image.

In various example embodiments, the display driving circuit can be configured to activate the at least one pixel and inactivate the at least one another pixel based on synthesizing the image and an image of a screen to be displayed.

A method executed in an electronic device with a window including a first region, display panel facing one surface of the window, and including a first opening, an adhesive member comprising an adhesive material interposed between the window and the display panel, and including a second opening, an opaque member comprising an opaque material disposed along a periphery of the first region when viewed from above the window, and a sensor disposed under the window and at least partially visible through the first opening and the second opening, of various example embodiments as described above, can include: activating some pixels of the display panel disposed in a region where the display panel overlaps the opaque member when viewed from above the window.

A method executed in an electronic device with a window including a first region, a display panel facing one surface of the window, and including a first opening, an adhesive member comprising an adhesive material interposed between the window and the display panel, and including a second opening, an opaque member comprising an opaque material disposed along a periphery of the first region when viewed from above the window, a sensor disposed under the window and at least partially visible through the first opening and the second opening, of various example embodiments as described above, can include: inactivating at least one pixel disposed within a projection of the opaque member when viewed from above the window among pixels of the display panel and activating at least one other pixel disposed outside of the projection of the opaque member when viewed from above the window among the pixels, based on an image of a first region of the display panel having a shape corresponding to an outer periphery of the opaque member and partially overlapping the opaque member when viewed from above, in a state of vertically facing another surface of the window.

For an electronic device with a window including a first region, a display panel facing one surface of the window, and including a first opening, an adhesive member comprising an adhesive material interposed between the window and the display panel, and including a second opening, an opaque member comprising an opaque material disposed along a periphery of the first region when viewed from above the window, and a sensor disposed under the window and at least partially seen through the first opening and the second opening, a non-transitory computer readable storage medium of various example embodiments as described above can store an image of a second region of the display panel having a shape corresponding to an outer periphery of the opaque member and partially overlapping the opaque member when viewed from above, in a state of vertically facing another surface of the window.

Methods of embodiments mentioned in claims the present disclosure can be implemented in the form of hardware, software, or a combination of hardware and software.

In response to being implemented by software, a non-transitory computer-readable storage media storing one or more programs (software modules) can be offered. The one or more programs stored in the computer-readable storage media are configured to be executable by one or more processors within an electronic device. The one or more programs include instructions for enabling the electronic device to execute methods of embodiments mentioned in the claims or specification of the present disclosure.

These programs (e.g., software modules and/or software) can be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. Or, it can be stored in a memory that is configured in combination of some, or all, of them. Also, each configured memory can be included in the plural as well.

The program can be stored in an attachable storage device that can access via a communication network such as the Internet, an intranet, a local area network (LAN), a wireless LAN (WLAN) or a storage area network (SAN), or a communication network configured in combination of them. This storage device can access a device performing an embodiment of the present disclosure via an external port. Also, a separate storage device on the communication network can access the device performing the embodiment of the present disclosure as well.

In the above-described example embodiments of the disclosure, components included in the disclosure have been expressed in the singular form or plural form according to a example embodiment. But, the expression of the singular form or plural form is selected suitable to a given situation for description convenience's sake, and the present disclosure is not limited to singular or plural components. Even if it is a component expressed in the plural form, it can be constructed in the singular form, or even if it is a component expressed in the singular form, it can be constructed in the plural form.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   a window comprising a first region;
   a display panel facing one surface of the window, and comprising a first opening;
   an adhesive member comprising an adhesive material interposed between the window and the display panel, and comprising a second opening;
   an opaque member comprising an opaque material disposed along a periphery of the first region when viewed from above the window;
   a sensor disposed under the window and at least partially visible through the first opening and the second opening; and
   a display driving circuit operably coupled with the display panel,
   wherein the display driving circuit is configured to activate some first pixels among the pixels of the display panel disposed in a region where the display panel overlaps the opaque member when viewed from above the window.

2. The electronic device of claim 1, wherein remaining second pixels other that the first pixels are configured to be inactivated while the first pixels are activated.

3. The electronic device of claim 2, wherein the first pixels are disposed substantially surrounding the second pixels.

4. The electronic device of claim 3, wherein the display driving circuit is configured to activate the first pixels to display a gradation effect.

5. The electronic device of claim 4, wherein the first pixels display the gradation effect together with third pixels among other pixels of the display panel that surround the opaque member when viewed from above the window.

6. The electronic device of claim 5, wherein the third pixels of the other pixels are located within a specified distance from the center of the first region.

7. The electronic device of claim 6, wherein fourth pixels other than the third pixels among the other pixels display a screen independent of the gradation effect.

8. The electronic device of claim 1, wherein a size of the second opening is less than a size of the first opening.

9. The electronic device of claim 1, wherein the sensor comprises at least one of a sensor configured to emit light towards an outside of the electronic device, a sensor configured to receive light from the outside, a sensor configured to output a sound towards the outside, or a sensor configured to receive a sound from the outside.

10. The electronic device of claim 1, wherein the adhesive material of the adhesive member comprises an optical clear adhesive (OCA).

11. The electronic device of claim 1, wherein the opaque member is interposed between the window and the display panel to hide a wire for driving the display panel.

12. The electronic device of claim 11, wherein the opaque material of the opaque member comprises an opaque resin or an opaque ink.

13. The electronic device of claim 1, further comprising a transparent touch panel interposed between the window and the adhesive member,
wherein the opaque member is interposed between the touch panel and the window.

14. The electronic device of claim 13, wherein touch patterns of the touch panel disposed over some of the pixels are inactivated while some first pixels among the pixels are activated.

15. The electronic device of claim 1, further comprising a support disposed opposite the window of the display panel, the support comprising a third opening, and supporting at least one of the display panel, the adhesive member, or the opaque member.

16. An electronic device comprising:
a window comprising a first region;
a display panel facing one surface of the window, and comprising a first opening;
an adhesive member comprising an adhesive material interposed between the window and the display panel, and comprising a second opening;
an opaque member comprising an opaque material disposed along a periphery of the first region when viewed from above the window;
a sensor disposed under the window and at least partially visible through the first opening and the second opening; and
a display driving circuit operably coupled with the display panel,
wherein the display driving circuit is configured to:
activate at least one pixel disposed within a projection of the opaque member when viewed from above the window among pixels of the display panel, and
inactivate at least one other pixel disposed outside the projection of the opaque member when viewed from above the window among the pixels, based on an image of a second region of the display panel having a shape corresponding to an outer periphery of the opaque member and partially overlapping the opaque member when viewed from above, in a state of vertically facing another surface of the window.

17. The electronic device of claim 16, wherein the image can include a vector image.

18. The electronic device of claim 16, wherein the electronic device can further include a memory external to the display driving circuit configured to store the image.

19. The electronic device of claim 16, wherein the electronic device can further include a memory within the display driving circuit configured to store the image.

20. The electronic device of claim 16, wherein the display driving circuit can be configured to activate the at least one pixel and inactivate the at least one another pixel based on synthesizing the image and an image of a screen to be displayed.

* * * * *